US008928489B2

(12) United States Patent
DiLuciano et al.

(10) Patent No.: US 8,928,489 B2
(45) Date of Patent: * Jan. 6, 2015

(54) PING SERVER

(75) Inventors: Joshua Dominic DiLuciano, Spokane Valley, WA (US); Erik Jon Lee, Otis Orchards, WA (US); Robert David Cloward, Spokane Valley, WA (US); Allen Glenn Cousins, Mead, WA (US)

(73) Assignee: Avista Corporation, Spokane, WA (US)

( * ) Notice: Subject to any disclaimer, the term of this patent is extended or adjusted under 35 U.S.C. 154(b) by 733 days.

This patent is subject to a terminal disclaimer.

(21) Appl. No.: 13/023,368

(22) Filed: Feb. 8, 2011

(65) Prior Publication Data

US 2012/0200426 A1   Aug. 9, 2012

(51) Int. Cl.

| G08C 19/16 | (2006.01) |
|---|---|
| G08B 23/00 | (2006.01) |
| G08C 15/06 | (2006.01) |
| G05D 3/12 | (2006.01) |
| G05D 5/00 | (2006.01) |
| G05G 9/00 | (2006.01) |
| G05D 11/00 | (2006.01) |
| G05D 17/00 | (2006.01) |
| G01R 31/00 | (2006.01) |
| H04L 12/24 | (2006.01) |
| H04L 12/26 | (2006.01) |

(52) U.S. Cl.
CPC .......... *H04L 41/0645* (2013.01); *H04L 41/065* (2013.01); *H04L 43/0817* (2013.01); *H04L 43/10* (2013.01)
USPC ................. 340/870.02; 340/870.01; 700/286; 700/292; 702/59

(58) Field of Classification Search
CPC .............. G06Q 50/00; G06Q 50/06; H04B 2203/5433; H04L 41/0645; H04L 41/065; H04L 43/0817; H04L 43/10; H04Q 2209/00; H04Q 2209/10; H04Q 2209/60
USPC ............. 340/870.01, 870.02, 870.03, 870.07; 700/22, 286, 291, 292, 293, 294; 702/57, 58, 59
See application file for complete search history.

(56) References Cited

U.S. PATENT DOCUMENTS

| 4,124,835 | A | | 11/1978 | Cahill, Jr. |
|---|---|---|---|---|
| 5,204,896 | A | | 4/1993 | Oliver |
| 5,568,399 | A | | 10/1996 | Sumic |
| 5,602,744 | A | * | 2/1997 | Meek et al. .................. 705/412 |
| 5,684,710 | A | | 11/1997 | Ehlers et al. |

(Continued)

OTHER PUBLICATIONS

Honghai et al., "Application of AMR Based on Powerline Comminication in Outage Management Systems", International Conference on Sustainable Power Generation and Supply, Apr. 2009, SUPERGEN 09, pp. 1-4.

(Continued)

*Primary Examiner* — Hai Phan
*Assistant Examiner* — Franklin Balseca
(74) *Attorney, Agent, or Firm* — Lee & Hayes, PLLC

(57) ABSTRACT

Techniques and systems are described that assist in predicting, diagnosing, and/or managing an incident in a utility service area. A communication system is provided in the service area to communicate with nodes of the service area. Nodes of the service area may communicate with the communication system using a variety of different communication technologies and/or communication protocols. In some instances, the communication system may detect a communication technology and/or a communication protocol used by a node.

36 Claims, 6 Drawing Sheets

(56) References Cited

U.S. PATENT DOCUMENTS

| | | | |
|---|---|---|---|
| 5,719,564 A * | 2/1998 | Sears | 340/870.02 |
| 5,943,246 A | 8/1999 | Porter | |
| 6,002,260 A | 12/1999 | Lau et al. | |
| 6,259,972 B1 | 7/2001 | Sumic et al. | |
| 6,393,341 B1 * | 5/2002 | Lawrence et al. | 700/286 |
| 6,396,839 B1 | 5/2002 | Ardalan et al. | |
| 6,453,248 B1 | 9/2002 | Hart et al. | |
| 6,628,207 B1 | 9/2003 | Hemminger et al. | |
| 6,687,574 B2 | 2/2004 | Pietrowicz et al. | |
| 6,747,981 B2 | 6/2004 | Ardalan et al. | |
| 6,788,214 B2 | 9/2004 | Lelecas | |
| 6,954,814 B1 | 10/2005 | Leach | |
| 7,010,437 B2 | 3/2006 | Lubkeman et al. | |
| 7,231,482 B2 | 6/2007 | Leach | |
| 7,308,370 B2 * | 12/2007 | Mason et al. | 702/65 |
| 7,312,721 B2 * | 12/2007 | Mason et al. | 340/870.02 |
| 7,496,430 B2 | 2/2009 | Mak | |
| 7,525,423 B2 | 4/2009 | Berkman et al. | |
| 7,551,984 B1 | 6/2009 | Fickey et al. | |
| 7,586,420 B2 * | 9/2009 | Fischer et al. | 340/635 |
| 7,627,453 B2 | 12/2009 | Keefe et al. | |
| 7,672,812 B2 | 3/2010 | Stoupis et al. | |
| 7,739,138 B2 | 6/2010 | Chauhan et al. | |
| 7,853,417 B2 * | 12/2010 | Vaswani et al. | 702/60 |
| 8,077,049 B2 | 12/2011 | Yaney et al. | |
| 8,121,740 B2 | 2/2012 | Yang et al. | |
| 8,121,741 B2 | 2/2012 | Taft et al. | |
| 8,207,726 B2 | 6/2012 | Vaswani et al. | |
| 2004/0236620 A1 | 11/2004 | Chauhan et al. | |
| 2005/0096856 A1 | 5/2005 | Lubkeman et al. | |
| 2006/0055549 A1 | 3/2006 | Fischer et al. | |
| 2006/0217936 A1 | 9/2006 | Mason et al. | |
| 2007/0013547 A1 * | 1/2007 | Boaz | 340/870.02 |
| 2008/0074285 A1 * | 3/2008 | Guthrie | 340/870.02 |
| 2009/0119068 A1 | 5/2009 | Banting | |
| 2009/0184835 A1 | 7/2009 | Deaver, Sr. et al. | |
| 2009/0187284 A1 | 7/2009 | Kreiss et al. | |
| 2009/0187285 A1 | 7/2009 | Yaney et al. | |
| 2009/0240449 A1 | 9/2009 | Gibala et al. | |
| 2009/0281740 A1 | 11/2009 | Stoupis et al. | |
| 2010/0152910 A1 | 6/2010 | Taft | |
| 2010/0265096 A1 | 10/2010 | Cornwall et al. | |
| 2011/0077790 A1 | 3/2011 | Vaswani et al. | |
| 2012/0197558 A1 | 8/2012 | Henig et al. | |
| 2012/0200423 A1 | 8/2012 | DiLuciano et al. | |
| 2012/0203388 A1 | 8/2012 | DiLuciano et al. | |

OTHER PUBLICATIONS

Kearney, "How Outage Management Systems Can Improve Customer Service", 8th International Conference on Transmission and Distribution Construction, operations and Live-Line Mainteance Proceedings, 1998, ESMO 98, IEEE, pp. 172-178.

Non-Final Office Action for U.S. Appl. No. 13/023,353, mailed on Mar. 26, 2013, Joshua Dominic DiLuciano et al., "Outage Management Algorithm", 14 Pages.

Scott et L., "Automating the Restoration of Distribution Services in Major Emergencies", IEEE Translations on Power Delivery, Apr. 1990, vol. 5, No. 2, pp. 1034-1039.

Office Action for U.S. Appl. No. 13/023,388, mailed on Jan. 16, 2014, Joshua Dominic DiLuciano, "Outage Prediction With Next Generation Smart Grid", 20 pages.

* cited by examiner

PING SERVER

BACKGROUND

Traditionally, service calls for power outages and other power problems have been diagnosed in a similar manner. A customer experiences an event, the customer calls in the event to the power utility, and a crew is dispatched from the utility to determine the source of the problem. Unfortunately, it can be expensive to physically send a crew to a site for every diagnostic. This is also the traditional model for other utility and service providers as well, such as cable and satellite television providers, telephone service providers, water and gas providers, and the like. Accordingly, the costs of providing these services could be reduced with an automated and/or remote diagnostic system.

As part of automating their processes, some utilities and other service providers have employed end point devices (such as meters, for example) with an ability to communicate to a mobile or fixed hub or collector. Many of these end point devices are configured to broadcast usage information, and the like, to the hub, using one-way communication (e.g., Automatic Meter Reading (AMR)). Some "smart" end point devices, however, are also able to receive and respond to limited inquiries from a hub device. Many of the end point devices (and hubs) capable of one-way or two-way communication transfer messages using particular technologies and/or proprietary communication protocols. For example, some devices may communicate via power line carrier while others may use wireless technologies such as cellular, Wireless Fidelity (Wi-Fi™), or the like. Consequently, utilities may use multiple different communication technologies and/or protocols across their service areas due to upgrades, expansions, and the like, occurring over the years. Integration of such a heterogeneous network of devices and communication systems can add layers of difficulty to a comprehensive communication scheme, and thus, complicate an effort to automate the diagnosis of power problems within the service area.

Additionally, some utilities and service providers make use of intelligent map systems (i.e., geographic information systems (GISs)) that generally provide data as well as graphic displays regarding assets associated with a service area. For example, an intelligent map system may graphically show a utility's assets (e.g., transformers, isolation devices, regulators, capacitor banks, service points, etc.) on a map-like display, and store attributes associated to each of these assets in a related database. Attributes may include an operational status (e.g., whether the asset is on-line or off-line, etc.), a monetary value of the asset, specifications of the asset (e.g., voltage, phase, winding configuration, current rating, etc.), and the like. Further, the intelligent map system may display the asset in a particular manner (e.g., color, highlighting, line type, etc.) based on a value of one or more of the attributes associated with the asset. Thus, by using an intelligent map system, a utility may streamline processes involving access to and updating of information about the utility's service area by utility personnel.

Some utilities and service providers use an intelligent map system to track service calls. For example, when a customer calls in an event (e.g., a power outage, etc.), service personnel may change an attribute associated with an asset connected to the event (such as a meter, transformer, service point, etc.). Changing the attribute may then result in the asset being displayed in a different manner on the map, thereby marking the location of the event on the map. Multiple calls from customers may result in a pattern of marked assets that can help target a physical location to investigate when diagnosing a service area problem. Since such a system relies on customer reports, however, it may not be timely or accurate. For example, customers may not report an event or they may report it inaccurately. Even with accurate reporting, such a system may have limitations. For example, such a system still 1) is labor and time intensive; 2) is reactive rather than proactive, possibly resulting in delays in service restoration; and 3) does not provide for verification of service restoration, since most customers do not call a service provider to report a restoration of service.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This application describes techniques to assist in predicting, diagnosing, and/or managing an incident in a utility service area.

In one aspect, an outage management method includes detecting an incident in a hierarchal service area. At least one node (e.g., station, device, equipment, etc.) of the service area is identified as being associated with the incident. A preset quantity of nodes of the service area is selected for communication, based on the hierarchy of the system and/or a physical location of the node(s). The selection of nodes may also be made according to an algorithm, which may be adjusted based on various factors of the incident and/or the service area. The preset quantity of nodes is pinged, with the results of the pinging used to determine an appropriate response to the incident. The determined response may then be initiated. In some aspects, the pinging includes requesting information from the nodes and/or two-way communication between the nodes and a communication system.

In one aspect, a method includes interrogating nodes to determine communication technologies and/or communication protocols used by the nodes. The method may include using a look up table to determine communication information about a node. Implementations also include adjusting the algorithm based on the communication technologies and/or communication protocols used by the nodes.

In another aspect, a system is implemented that comprises one or more processors, memory, and modules implemented by the processor(s), based on instructions stored in the memory. One module may include a detection module configured to detect an incident in a service area. The detection module may also be configured to detect one or more devices associated with the incident. Another module may include a communication module configured to communicate with one or more devices in the service area according to an algorithm. In one embodiment, the algorithm directs the system to communicate with one or more devices in the service area in a manner based on the incident and the devices associated with the incident. For example, the algorithm may direct the system to communicate with the devices based on a hierarchy of the system, based on the capabilities of the devices to communicate with the system, and/or based on the technologies and/or protocols used by the devices. The communication module may be configured to communicate with devices using different or dissimilar communication technologies and/or communication protocols. Another module may include an analysis module configured to determine an appropriate response to the incident based on the communication between the communication module and one or more of the devices.

In another aspect, the algorithm may include multiple routines directing the system to perform additional operations. For example, additional operations may include communicating with additional devices when certain conditions are present or failure responses are received from one or more of the devices. The additional operations may also include recursively tracing the service area along distribution paths to troubleshoot the service area.

While described individually, the foregoing aspects are not mutually exclusive and any number of the aspects may be present in a given implementation.

BRIEF DESCRIPTION OF THE DRAWINGS

The Detailed Description is set forth with reference to the accompanying figures. In the figures, the left-most digit(s) of a reference number identifies the figure in which the reference number first appears. The same numbers are used throughout the drawings to reference like and/or corresponding aspects, features, and components.

DETAILED DESCRIPTION

Overview

Various embodiments of an example outage management system are disclosed, for use by a wide range of utilities and/or other service providers (e.g., electrical power utilities, cable and satellite television providers, telephone service providers, water and gas providers, and the like; all referred to herein as "utilities"). Example embodiments assist utilities in predicting, diagnosing, and/or managing outages or other breaks in service ("incidents"), including sub-standard or poor quality service. In some embodiments, incidents may also include false readings, malfunctions, and/or tampering associated with services. Example embodiments of an outage management system may be partially or fully automated in various implementations, with fully automated implementations not requiring human intervention or assistance to perform the predicting, diagnosing, and/or managing.

Figure 1:
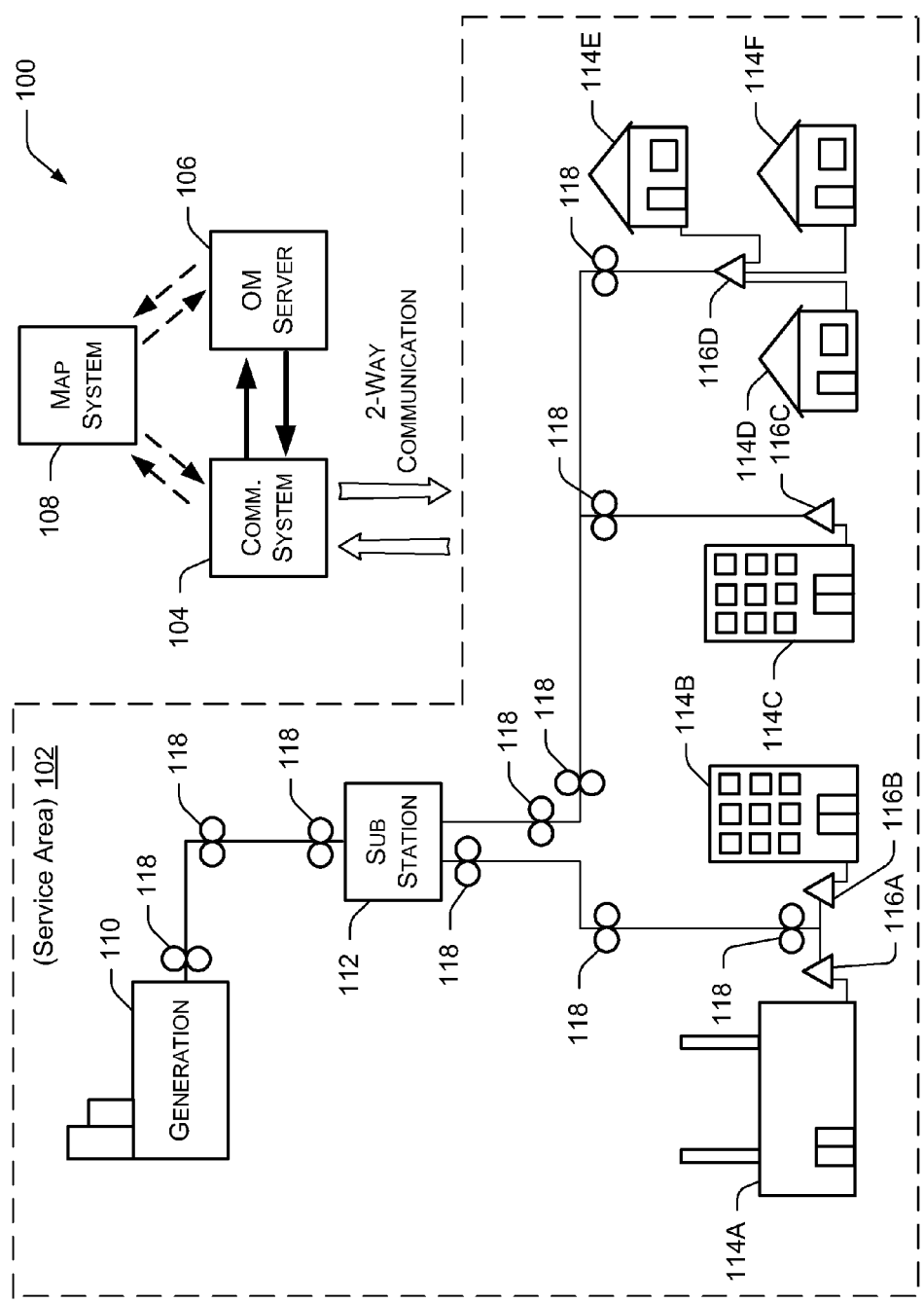
FIG. 1 is a schematic illustration showing an example environment for implementing an outage management system according to one embodiment. The example environment includes an example service area, a communication system configured to engage in two-way communication with one or more elements of the service area, and an outage management server coupled to the communication system.

The application describes a representative environment for implementing an outage management system, including an example utility service area, with reference to FIG. 1. The example utility service area is described in terms of an electrical power service area for ease of discussion, but applies equally to service areas of all utilities and service providers mentioned above, and the like. The application then describes an example communication system implemented in a service area with reference to FIG. 2, including example components of the communication system. Various technologies that may be used in the implementation of an outage management system are described using examples. Specifically, the application describes example implementations of a "ping server," a device used to communicate with nodes or devices in the service area to implement a partially or fully automated outage management system. The application then describes the management/diagnosis process in general terms. Specifics of an example outage management algorithm are described with reference to flow diagrams illustrated in FIGS. 3-5. The example outage management algorithm describes communicating with nodes or devices within the service area according to a progression to enhance detection and processing of an incident in the service area.

Example scenarios illuminating the functions of an example outage algorithm in a practical manner are discussed with reference to FIG. 6. The scenarios walk through examples of how an algorithm may track down and process an outage or similar incident.

Example Environment and Service Area

FIG. 1 is a schematic illustration showing an example environment for implementing an outage management system 100 according to one embodiment. The example environment includes an example service area 102, a communication system 104 configured to engage in one-way and/or two-way communication with one or more elements of the service area 102, and an outage management server 106 coupled to the communication system. The outage management system 100 is merely illustrative. In various embodiments, some of the elements and features illustrated or described may be combined into one or more components. Also, fewer elements or more elements may be present in an example outage management system 100 without departing from the scope of the disclosure.

As mentioned above, the service area 102 is illustrated in FIG. 1 to resemble an electrical power service area. This is not intended to be a limitation, and is for ease of discussion only. The features and elements disclosed herein with regard to implementations of an outage management system 100 apply equally to any utility or service provider, such as those mentioned above. Assets, devices, equipment, end points, distribution components, and the like, within an example electrical power service area as described herein are merely illustrative. Components of other service areas corresponding to other utilities and service providers may also be used. For example, distribution lines shown in FIG. 1, and discussed below, may equally represent electrical power lines, water or natural gas pipe, fiber optic cables, coaxial cables, and the like.

FIG. 1 also illustrates an intelligent map system 108, which may be implemented in various embodiments. The intelligent map system 108 may communicate with the communication system 104 and/or the outage management server 106 in various embodiments, as will be discussed further.

FIG. 1 illustrates the example service area 102 as a hierarchal network of nodes, where the nodes may include stations, devices, components, equipment, and the like. FIG. 1 represents a simplified environment for ease of discussion. In practice, a service area 102 may include many hundreds or thousands of nodes. In various embodiments, the hierarchy of the service area 102 indicates a general flow of services from an origin to an end use. For example, an "upstream" component of a hierarchal service area 102 may supply or feed services to one or more other components "downstream" from the upstream component. In some implementations, this hierarchy provides an ability to "trace" a circuit or a services path, from a given point in the service area 102, either upstream to identify one or more source(s) of services or downstream to identify one or more distribution points or service end point(s) within the service area 102. In alternate embodiments, the hierarchal structure of the service area 102 may take other forms, including more or fewer peer levels (including a single peer level), having more or fewer components at a peer level, and the like.

FIG. 1 illustrates the example service area 102 to include a generation station 110 (i.e., supply or origination point, etc.), a substation 112 (i.e., distribution point) and a number of components, including: end user locations 114A-114F which receive electrical power distribution (i.e., services) via feeds, distribution lines, laterals, and the like. The end user locations 114A-114F may also be viewed for the purposes of this discussion as service points 114A-114F, representing termination points (i.e., service delivery points) within the service area 102. Service points 114A-114F are shown served via transformers 116A-116D, for example. Transformers 116A-116D may also represent sub-distribution points (e.g., hubs) in an alternate implementation of a service area 102. For example, in some service areas 102, a single transformer 116 (or hub, etc.) may feed multiple service points 114. A disconnecting or isolating device may be located at each of the service points 114A-114F. The service area 102 may also include one or more isolation devices 118 in various locations throughout the feeds, distribution lines, laterals, and the like, for isolating or disconnecting portions of the service area 102 for maintenance, installations, upgrades, and so forth.

In alternate embodiments, a service area 102 may include other devices (e.g., regulators, capacitor banks, reclosers, meters, etc.) or may include alternate devices for performing some tasks. For example, a cable television service area may include amplifiers, repeaters, translators, decoders, and the like. In alternate embodiments, the feeds, distribution lines, laterals, and the like, as shown in FIG. 1 may additionally or alternately include pipes, cables, trunks, fiber optics, wire, data lines, phone lines, conductors, and so forth.

Example Communication System (Ping Server)

In one embodiment, the communication system 104 is configured to communicate (one-way or two way) with one or more of the nodes (e.g., stations, devices, components, equipment, etc.) of the service area 102. The communication system 104 may be configured to collect information (e.g., usage data, telemetry, temperature, geographical information, etc.) from various devices within the service area 102. For example, the communication system 104 may be configured to collect usage information from service points 114A-114F. In alternate embodiments, the communication system 104 may be configured to interrogate one or more elements of the service area 102, and to receive information from the element(s) based on the interrogation. For example, the communication system 104 may query a particular service point 114E, for instance, and receive information from the service point 114E such as a status (e.g., on-line or off-line), various power quality measurements (voltage, current, power factor, waveform distortion, etc.), and the like. In an alternate implementation associated with a cable television service, the communication system 104 may receive information from a service point 114E such as signal strength, channels received at the location, impedance at the service point, and the like. Accordingly, in various embodiments, many, if not all, of the service points 114 may be configured for two-way communication with the communication system 104. In some embodiments, the communication system 104 may be referred to as a "ping server," relating to one of the communication system's functions of interrogating nodes of the service area 102. In various embodiments, the communication system 104 (ping server) may be implemented using a computing device, including a server, or the like, as discussed further.

In other implementations, the communication system 104 may be configured to communicate with an end user's device to provide information to the user. For example, the communication system 104 may be configured to send a text message to a user's mobile telephone, send an email to a user's email address, leave a voice message at a user-provided number, send information to an application installed on a user's computing/communication device, and the like. In one implementation, the communication system 104 is configured to notify a user of the status (e.g., on-line, off-line, low power, etc.) of a component (such as a meter, end point device, etc.) of the service area 102.

In one implementation, the communication system 104 is configured to communicate with the outage management server 106. Communication with the outage management server 106 may include reporting on elements within the service area 102, including providing status information, power quality measurements, usage information, and the like. Information received from the communications system 104 may be processed for a number of useful purposes, including prediction, diagnosis, and/or management of outages and other service incidents within the service area 102.

Figure 2:
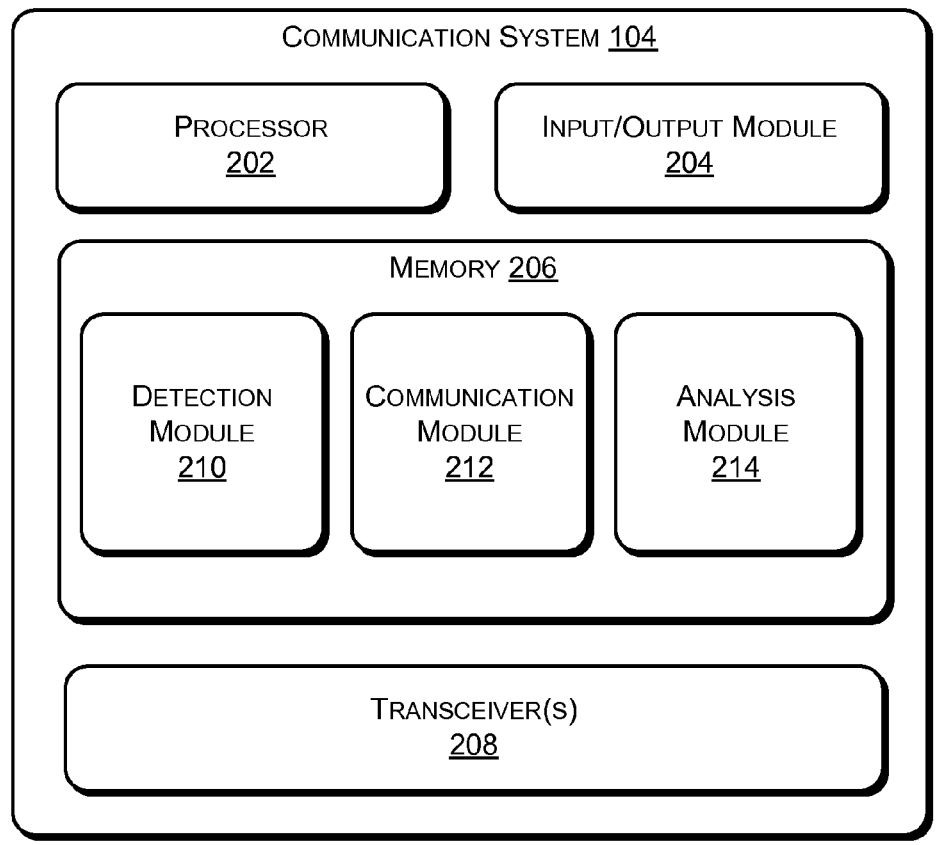
FIG. 2 is a schematic illustration showing an example communication system according to one embodiment.

An example communication system 104 is illustrated in the schematic drawing of FIG. 2. The example communication system 104 is shown having a processor 202. While only one processor 202 is shown, multiple parallel and/or dedicated processors could be used. The example communication system 104 is also shown having an input/output module 204, a memory 206, and one or more transceiver(s) 208. In various implementations, a communication system 104 may include more or less components and remain within the scope of the disclosure. For example, in some implementations, a communication system 104 may combine various elements or components into a single component, or break out various functions into individual components. In some examples, the one or more transceiver(s) 208 may be separate components, located within the communication system 104 or may be physically remote but communicatively coupled to the communication system 104. Further, transceiver(s) 208 may also include separate transmitters and/or receivers.

As shown in FIG. 2, the memory 206 may include various modules implemented by the processor 202, and based on instructions stored in the memory 206. For example, in an embodiment, the memory 206 is communicatively coupled to the processor 202 and contains stored computer executable instructions. When the instructions are executed by the processor, the communication system 104 may implement various functional modules. As shown in FIG. 2, modules may include a detection module 210, a communication module 212, and/or an analysis module 214. In alternate embodiments, fewer or additional modules may be implemented by the processor 202.

Example modules within a communication system 104, including the detection module 210, the communication module 212, the analysis module 214, and/or the input/output module 204 may be implemented using any form of computer-readable media (for example, memory 206 in FIG. 2) that is accessible by the processor 202 and/or the communication system 104. In one embodiment, one or more of the transceiver(s) 208 may be implemented using a form of computer-readable media. Computer-readable media may include, for example, computer storage media and communications media.

Computer-readable storage media includes volatile and nonvolatile, removable and non-removable media implemented in any method or technology for storage of information such as computer-readable instructions, data structures, program modules or other data. Memory 206 is an example of computer-readable storage media. In some embodiments, a communication system 104 may employ multiple memory devices to implement functional modules (e.g., modules 208, 210, and 212) or for other purposes. For this discussion, single or multiple memory devices are referred to as memory 206. Additional types of computer-readable storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may accessed by the processor 202.

In contrast, communication media typically embodies computer readable instructions, data structures, program modules, or other data in a modulated data signal, such as a carrier wave, or other transport mechanism. Computer readable storage media does not include communication media.

While the subject matter has been described above in the general context of computer-executable instructions of a computer program that runs on a computer and/or computers, those skilled in the art will recognize that the subject matter also may be implemented in combination with other program modules. Generally, program modules include routines, programs, components, data structures, and the like, which perform particular tasks and/or implement particular abstract data types.

Moreover, those skilled in the art will appreciate that the innovative techniques can be practiced with other computer system configurations, including single-processor or multiprocessor computer systems, mini-computing devices, mainframe computers, as well as personal computers, hand-held computing devices (e.g., personal digital assistant (PDA), smart phone, etc.), microprocessor-based or programmable consumer or industrial electronics, and the like. The illustrated aspects may also be practiced in distributed computing environments where tasks are performed by remote processing devices that are linked through a communications network. For example, one or more of the processor 202 and/or the memory 206 may be located remote from the communication system 104 and/or the outage management system 100. However, some, if not all aspects of the disclosure can be practiced on stand-alone computers. In a distributed computing environment, program modules may be located in both local and remote memory storage devices (such as memory 206, for example).

In an embodiment, the communication system 104 may communicate with the outage management server 106, the intelligent map system 108, and/or the devices and elements of the service area 102 via a network. In alternate embodiments, the network may include a network (e.g., wired or wireless network) such as a system area network or other type of network, and can include several nodes or hosts, (not shown), which can be personal computers, servers or other types of computers. In addition, the network can be, for example, an Ethernet LAN, a token ring LAN, or other LAN, a Wide Area Network (WAN), or the like. Moreover, such network can also include hardwired and/or optical and/or wireless connection paths. In an example embodiment, the network includes an intranet or the Internet.

In alternate embodiments, the communication system 104 may communicate via a wide range of communication technologies and/or communication protocols, within a network or otherwise. In other words, the service area 102 may be a heterogeneous service area, made up of a variety of components and elements using a variety of disparate communication technologies and/or protocols. Communication technologies as used herein describe the use of defined apparatuses and/or defined processes for communication. The apparatuses and processes used in various communication technologies are often formally recognized by standards bodies, and other professional and/or technical organizations (e.g., American National Standards Institute (ANSI), Institute of Electrical and Electronics Engineers (IEEE), etc.). For example, the communication system 104 may communicate with the outage management server 106, the intelligent map system 108, and/or the devices and elements of the (heterogeneous) service area 102 via communication technologies such as: power line carrier technology, local area wired network technology (e.g., Ethernet® technology), dial-up modem technology, cellular technology, satellite technology, local area wireless network technology (e.g., Wireless Fidelity (Wi-Fi™) technology), wide area wireless network technology (e.g., Worldwide Interoperability for Microwave Access (WiMAX™) technology), wireless personal area network technology (e.g., Bluetooth® technology), and/or any other known communication infrastructure.

Communication protocols as used herein describe formats and rules for communicating within a communication technology. An example protocol may include a string of lead characters and/or ending characters, a format for character or bit/byte/packet arrangement, syntax, an error check scheme, and the like.

As will be discussed, in alternate implementations, the communication system 104 may communicate with various elements and nodes of the service area 102 using more than one communication technology and/or more than one communication protocol. For example, the communication system 104 may communicate with one node of the service area 102 using one communication technology and/or communication protocol and another node of the service area 102 using another different (i.e., disparate) communication technology and/or different (disparate) communication protocol. Thus, the communication system 104 can be configured to communicate with a node (such as a utility service device, end point device, etc.) in the communication technology used by the node, and with the communication protocols understood by the node. In various implementations, the number and/or type of transceivers 208 included in the communication system 104 is determined by communication technologies used by the communication system 104 and/or by communication technologies used by nodes of the service area 102.

In one implementation, the communication system 104 is configured to interrogate one or more nodes (e.g., utility service devices, components, etc.) of the service area 102 to determine a communication technology and/or a communication protocol used by the node. In an implementation, the communication system 104 interrogates a node by sending the node a number of inquiries (pings) using different communication technologies and/or protocols. In other implementations, the communication system 104 may interrogate a node based on information available to the communication system 104. For example, the communication system 104 may receive some communication technology information and/or communication protocol information associated to a node when the node is installed in the service area 102. In alternate implementations, a node being interrogated may respond to the communication system 104 with a message verifying the communication technology and/or protocol used by the node.

In an implementation, the communication system 104 may reconfigure a communication technology and/or a communication protocol that the communication system 104 is using to communicate with a node, based on the interrogation. For example, in one embodiment, the communication system 104 may interrogate multiple nodes of the service area 102. The communication system 104 may then reconfigure a communication technology and/or communication protocol after communicating with a first node and prior to communicating with a second node (e.g., reconfigure from WiMAX™ technology to Bluetooth® technology, etc.). The communication system 104 may then continue to reconfigure a communication technology and/or communication protocol prior to communicating with each additional node, based on the communication technology and or communication protocol used by the additional node.

Consequently, the communication system 104 is able to communicate with a heterogeneous network of nodes, where the nodes use various and disparate communication technologies and/or communication protocols, including different versions (or vintages) of a common technology or protocol. For example, several nodes of the service area 102 may use cellular technology, with some of the nodes using a newer or more recently developed type of cellular technology than others of the nodes. In an example implementation, the communication system 104 is able to communicate with the nodes by reconfiguring to accommodate the different versions of cellular technology.

In one implementation, the communication system 104 is configured to automatically initiate communication with one or more nodes (e.g., utility service devices) of the service area 102 to perform maintenance, system checks, and the like. For example, the communication system 104 may initiate communication with one or more nodes to perform one or more of: an inventory, a status check, a power quality audit, a validation of installation, a maintenance routine, an isolation of an incident, a diagnosis, a validation of restoration of services, and the like. In one embodiment, the communication system 104 may perform these types of communications according to a maintenance schedule or other preset plan. In an alternate embodiment, the communication system 104 may perform such communications randomly, upon request, upon occurrence of certain events (e.g., a reboot, wide spread outage, etc.).

In one implementation, the communication system 104 communicates with the outage management server 106, the intelligent map system 108, and/or the devices and elements of the service area 102 (the nodes of the service area 102) via the input/output module 204. In an embodiment, the input/output module 204 includes hardware, firmware, software, and/or the like, to provide communication with the nodes of the service area 102 via the transceiver(s) 208. For example, in alternate embodiments, the input/output module 204 may contain interfaces, modems, application programming interfaces (API), network interfaces, converters, and/or the like, such that a communication information string formulated by the communication system 104 can be translated and transmitted, using one or more of the transceiver(s) 208, to the intended nodes of the service area 102, using one or more communication technologies. Accordingly, in various embodiments, the input/output module 204 also performs a similar function with regard to communication information received by the transceiver(s) 208, allowing the received communication information to be processed and understood by the communication system 104.

In one illustrative example, a message is received from an end point device (service point) 114 by a transceiver 208 via power line carrier technology. The message is then translated by the input/output module 204 for processing by the processor 202. A response may be formulated by the processor 202, translated into multiple formats by the input/output module 204, and transmitted to the end point device 114 by power line carrier technology using one transceiver 208 and also transmitted to the outage management server 106 by Ethernet® technology using another of the transceivers 208. In this example, the response message is translated by the input/output module 204 into a format to be transmitted by power line carrier and understood by an end point device 114 that communicates using power line carrier, and also translated by the input/output module 204 into a format to be transmitted by Ethernet® technology and understood by an outage management server 106 that communicates using Ethernet® technology. Thus, the input/output module 204 provides translation for messages communicated between a node of the service area 102 and the transceiver(s) 208 of the communication system 104.

In other examples, the input/output module 204 may translate a message into multiple formats to be transmitted to multiple end point devices 114, where the end point devices 114 communicate using different communication technologies. For example, the input/output module 204 may translate a message into a cellular technology format, a Wi-Fi™ technology format, and a dial-up modem technology format, for transmission to different end point devices 114 using those technologies. Accordingly, messages received from the different end point devices 114 of this example may be translated from those communication technologies by the input/output module 204 into a format to be understood and processed by the processor 202.

In one embodiment, the input/output module 204 accesses a database and/or a look up table for information associating the elements and nodes of the service area 102 with their respective communication technologies and/or protocols. In alternate embodiments, the database and/or look up table is located local or remote to the communication system 104. In one example, the database and/or look up table is located on a remote server accessed via a network (e.g., the Internet, an intranet, etc.). In an implementation, the database and/or look up table is located in the memory 206. In one embodiment, the look-up table is populated with information derived from an intelligent map system 108. Additionally or alternatively, the input/output module 204 accesses information associating elements and nodes of the service area 102 with their respective communication technologies and/or protocols using other methods (e.g., software application, firmware, etc.).

As discussed above and shown in FIG. 2, modules implemented by the processor 202 based on instructions stored in the memory 206 may include a detection module 210, a communication module 212, and/or an analysis module 214. In alternate embodiments, the communication system 104 may be comprised of fewer or additional modules and perform the discussed techniques within the scope of the disclosure. Further, in alternate embodiments, one or more of the modules may be remotely located with respect to the communication system 104. For example, a module (such as the detection module 210, for example) may be located at a remote network location.

If included, the detection module 210 provides information to the communication system 104, the outage management server 106, and/or the intelligent map system 108 regarding nodes of the service area 102 and/or incidents involving the service area 102. In one implementation, the detection module 210 detects an incident associated with a node of the service area 102. For example, the detection module 210 may detect that an electrical meter within an electrical power service area is off-line (i.e., not energized, not communicating, etc.). In an embodiment, the detection module 210 may detect a transformer and/or an electrical circuit associated with the electrical meter. For example, the detection module 210 may detect that the electrical meter is on "phase A" of an identified electrical circuit. Accordingly, in some implementations, the detection module 210 may "trace" a circuit or services path upstream from a given point within the service area 102 to identify components above the given point in the hierarchy or downstream from a given point within the service area 102 to identify components below the given point in the hierarchy. In one implementation, the detection module 210 may trace the circuit or services path to detect components associated to a detected incident in the service area 102.

In one implementation, the detection module 210 detects information about nodes of the service area 102 via an intelligent map system 108. In an embodiment, the detection module 210 receives information from the intelligent map system 108 regarding an incident within the service area 102. For example, the detection module 210 may receive information from the intelligent map system 108 regarding an incident associated with an identified electrical meter, on an identified electrical circuit, being fed by an identified transformer on the circuit.

In one embodiment, the detection module 210 detects the presence of nodes within the service area 102. In an embodiment, the detection module is configured to detect one or more electrical service devices according to an algorithm, as discussed further below. The detection module 210 may also detect various information regarding detected nodes within the service area 102. The detected information may include a location of the node, circuit connection information, phase association, peer level within the hierarchy, and the like. For example, in one embodiment, the detection module 210 is configured to detect one or more utility service meters within a hierarchal utility service area 102. Accordingly, the detection module 210 may detect a hierarchal structure of the utility service meters with respect to each other and/or other nodes within the service area 102.

In various implementations, the detection module 210 may detect a node within the service area 102 (and in some embodiments, information associated to the node) when the node is added to the service area 102, upon initialization of the communication system 104, upon detection of an incident within the service area 102, and the like. For example, the detection module 210 may detect a node in a plug-and-play fashion, when the node is installed within the service area 102. In some embodiments, the installation of a node may also include a software installation to a portion of the service area 102, for instance to the communication system 104. In another example, the communication system 104 may perform a start-up routine upon initialization that includes a search by the detection module 210 of the service area 102 for connected nodes.

In one implementation, the detection module 210 detects a node (such as a utility service device) added to the service area 102 based on information received from the intelligent map system 108. In one example, the detection module 210 may receive information from the intelligent map system 108 when a node is newly added to the service area 102. For example, the received information may include location information and/or hierarchal information of the added node. Thus, changes to the service area 102 that are tracked by the intelligent map system 108 may be communicated to the detection module 210. In one embodiment, the detection module 210 may receive information from the intelligent map system 108 while performing a search of the service area 102 for connected nodes (for example, during initialization of the communication system 104). In that case, the detection module 210 may receive information from the intelligent map system 108 regarding some or all of the nodes that are being tracked by the intelligent map system 108.

If included, the communication module 212 provides communication support for the communication system 104 and the components of the service area 102. In an implementation, the communication module 212 carries out data-related communication tasks for the communication system 104. In various implementations, the communication module 212 may store communication algorithms, communication technology information, communication protocol information, communication scripts, service area element information, and the like.

In some embodiments, the communication module 212 is configured to communicate with various electrical service devices including: an electrical service meter, a transformer, a breaker, a fuse, a recloser, a capacitor, a relay, or a switch. In other embodiments, the communication module 212 is configured to communicate with other components, devices, and the like (e.g., gas meter, water meter, cable television distribution hub, etc.) in other types of service areas 102. The communication module 212 may communicate with multiple devices or nodes using one or more communication technologies and/or one or more communication protocols that may be disparate from each other. For example, the communication module 212 may communicate with multiple utility service meters, for example, using one or more disparate communication technologies and/or one or more disparate communication protocols via the input/output module 204 and one or more transceiver(s) 208. In alternate embodiments, the communication module 212 communicates one-way or two-way with the multiple nodes and service devices.

In one embodiment, the communication module 212 communicates with nodes of the service area 102 according to an algorithm. For example, the communication module 212 may communicate with multiple utility service meters, as described above, according to an arrangement described by the algorithm. In alternate embodiments, an algorithm may be stored locally (e.g., in memory 206, in the communication module 212, etc.) and/or stored remotely (e.g., stored on a remote server, stored on a portable memory storage device, etc.).

In various embodiments, the algorithm includes one or more routines having steps to be performed by the communication system 104 when communicating with nodes of the service area 102. In one embodiment, the algorithm determines the number of nodes to be contacted and the order that they are to be contacted. In another embodiment, the algorithm directs the communication system 104 to communicate with particular nodes of the service area 102. In one embodiment, the algorithm is adjustable, depending on the nature of the communication with the components of the service area 102. In another embodiment, the algorithm is adjustable based at least in part on the communication technologies used by the components (e.g., utility service meters, transformers, isolation devices, etc.) of the service area 102. In a further embodiment, the algorithm may be adjusted by a user. These embodiments and others will be described further.

In one implementation, the communication module 212 is configured to automatically initiate communication with one or more components of the service area 102 to perform maintenance, system checks, and the like. For example, in one embodiment, the communication module 212 automatically initiates communication with one or more components of the service area 102 (such as electrical service devices) to perform: an inventory, a status check, a power quality audit, a standards compliance check, a validation of installation, a maintenance routine, an isolation of an incident, a diagnosis, and/or a validation of restoration of services. In other embodiments, the communication module 212 may automatically initiate communication with one or more nodes of the service area 102 for other purposes (for example, due to an incident, such as a break in service occurring in the service area 102).

In various embodiments, the communication module 212 is capable of performing remote tasks in addition to simply communicating with a node of the service area 102. For example, in an embodiment, the communication module 212 is configured to remotely disable services at one or more nodes (such as electrical service devices) of the service area 102. In alternate embodiments, the communication module is capable of various other tasks, such as software installation or upgrades at nodes, initializing or rebooting components, and the like.

If included, the analysis module 214 provides analytical and/or logistical support to the communication system 104. In one embodiment, the analysis module 214 determines a response to an incident in the service area 102 based on communication between the communication system 104 and one or more components of the service area 102. For example, if communication between the communication module 212 and one or more components of the service area 102 reveals that an electrical service meter that has been reported to be off-line (i.e., in a failure state) is actually on-line (i.e., working within preset tolerances), the analysis module 214 may determine that an appropriate response to the incident is to close the matter and notify the party reporting the incident that the meter is on-line (i.e., operating normally, within a preset tolerance, etc.). A tolerance, for example, may include a range of values indicating normal operation for a meter (or other device), and may be preset (manually or automatically) based on accepted industry standards, or the like. Examples of a preset tolerance may include: a voltage tolerance, a phase or power factor tolerance, a distortion tolerance, a frequency tolerance, a transient event tolerance, and the like.

Alternately, if communication between the communication module 212 and one or more nodes of the service area 102 reveals that an electrical service meter is off-line, the analysis module 214 may determine the appropriate crew size, repair equipment, spare parts, and the like to send to the scene to correct the incident. Thus, in various implementations, the analysis module may provide partially or fully automated responses to incidents based on communications conducted (or based on failed communications).

In one implementation, the analysis module 214 may notify the communication module 212 to automatically initiate a service call based on the response determined from the analysis module 212. For example, in one implementation, the communication module 212 may send a message to the outage management server 106 to dispatch a crew to the scene of the incident. In another implementation, the communication module may send a message to a dispatch service, or may automatically dispatch a crew to the scene of the incident based on the notification received from the analysis module 214. In various embodiments, the communication module 212 may dispatch a crew using diverse methods including visual and/or auditory indicators, electronic text or instant messaging, automated voice messaging, and the like. In one embodiment, the communication module 212 dispatches a crew through indications on an intelligent map system 108.

Additionally, in one embodiment, the analysis module 214 determines whether the algorithm used by the communication module 212 is to be adjusted. For example, in one implementation, the analysis module 214 receives information from the detection module 210 regarding a number of nodes, or a number of types of nodes, within the service area 102 that are capable of two-way communication with the communication system 104. Based on that information, the analysis module 214 may determine that the algorithm is to be adjusted. The analysis module 214 may make the determination based on one or more threshold values, or based on particular types of nodes, or the like. For instance, if the detection module 210 determines that 95% of electric service meters and 80% of transformers on an electrical circuit identified as being associated with an incident are capable of two-way communication with the communication system 104, the analysis module may determine that the algorithm is to be adjusted. Additionally, in various embodiments, the analysis module 214 may determine incremental adjustments to the algorithm at various threshold values.

In one embodiment, the analysis module 214 may notify a user of the adjustments determined for the algorithm. This notification may be in the form of a message on a display, an indicator on an actual or virtual dashboard, or the like. Alternately or additionally, the analysis module 214 may make the determined adjustments to the algorithm autonomously based on the determinations.

The outage management server 106 is communicatively coupled to the communication system 104. In an embodiment, the outage management server performs outage management functionality for the service area 102. For example, in one embodiment, the outage management server 106 formulates a response to an incident within the service area 102, based on communication between the communication system 104 and one or more of the nodes of the service area 102. The outage management server 106 may perform response formulation in addition to, or alternate to, the analysis module 214. In one implementation, the outage management server 106 may send a notification to a dispatch service to dispatch a repair crew in response to an incident within the service area 102. Alternately or additionally, the outage management server 106 may direct the communication module 212 to send a message to a dispatch service or to autonomously dispatch a crew as discussed above.

In one implementation, the outage management server 106 may provide communication between the communication system 104 and the intelligent map system 108. For example, in some implementations, the outage management server 106 may pass information between the communication system 104 and the intelligent map system 108. For instance, the outage management server 106 may notify the communication system 104 of changes to nodes of the service area 102 that are being tracked by the intelligent map system 108. Accordingly, the outage management system 106 may notify the intelligent map system 108 (by writing to an attribute database, for example) when a status changes for a node of the service area 102 (e.g., a meter goes off-line, a transformer is installed, a circuit is re-routed, etc.).

As described above, the intelligent map system 108 may be communicatively coupled to the communication system 104 and/or the outage management server 106. "Intelligent map system" (also known as a geographic information system (GIS)) as used herein, is a term of art used for a computerized map system that is coupled to a data resource, such that items displayed on a graphic portion of the intelligent map system are representative of geocoded data stored in the data resource. Intelligent map systems are generally capable of various data analysis and modeling tasks, based on attributes stored for the displayed items. One example of an intelligent map system is ArcGIS™ from ESRI Products, Redlands, Calif.

In one embodiment, the intelligent map system 108 is configured to update based on communication between the communication system 104 and one or more of the nodes (e.g., utility service devices) of the service area 102. In alternate embodiments, the intelligent map system 108 receives information regarding such communication through the communication system 104 and/or the outage management server 106. Also, as described above, the communication system 104 and/or the outage management server 106 receive information regarding the service area from the intelligent map system 108.

In various implementations, the intelligent map system 108 may track multiple aspects of the nodes of the service area 102 such as: inventory of a utility's assets (e.g., transformers, isolation devices, regulators, capacitor banks, service points, etc.), attributes associated to each of these components including operational status (whether the asset is on-line or off-line), the monetary value of the component, specifications of the component (e.g., voltage, phase, winding configuration, current rating, etc.), and the like. Further, the intelligent map system 108 may display the node in a particular manner (e.g., color, highlighting, line type, etc.) to indicate a value of one or more of the attributes associated with the node. In some embodiments, one or more of the informational aspects tracked by the intelligent map system 108 is used by the communication system 104 and/or the outage management server 106 for detection, prediction, and/or management of incidents within the service area 102.

In one embodiment, the intelligent map system 108 is configured to update a database comprising communication technology information and/or communication protocol information about one or more nodes (e.g., utility service devices) of the service area 102. In an embodiment, the database is used by the communication system 104 to determine a communication technology and/or a communication protocol to use when communicating with a particular node of the service area 102.

In an embodiment, the intelligent map system 108 is configured to be updated based on information received from the nodes (such as utility service meters) of the service area 102. In one implementation, updating the intelligent map system 108 includes updating the database. For example, information received by the communication system 104 while communicating with a node of the service area 102 may be passed to the intelligent map system 108. In one embodiment, the communication module 212 is configured to trigger the intelligent map system 108 to be updated based on a response to an incident within the service area 102. For example, the intelligent map system 108 may indicate an incident associated with a node of the service area 102, and when a response to the incident is formulated and/or implemented, the intelligent map system 108 is triggered by the communication module 212 to update based on the response.

In various embodiments, one or more utility service end points in a service area 102 may have additional capabilities. In one embodiment, at least one utility service meter (such as a meter 114) in a service area 102 is configurable to receive a request for information from a user and/or notify a user of a status of the utility service meter or another meter or node. For example, the utility service meter may receive a request via the internet, a mobile device, or the like, and notify the user of a status of a meter or node via email, text message, and/or mobile device application.

In another embodiment, a utility service meter of the service area 102 is configurable to notify the communication system 104 when there is a loss of power at utility service meter. This may be accomplished using a battery or solar powered radio, or the like, installed at the site of the meter. In an alternate embodiment, the meter may send the notification when there is a minimum voltage threshold measured at the meter.

Example Management/Diagnosis Process

Figure 3:
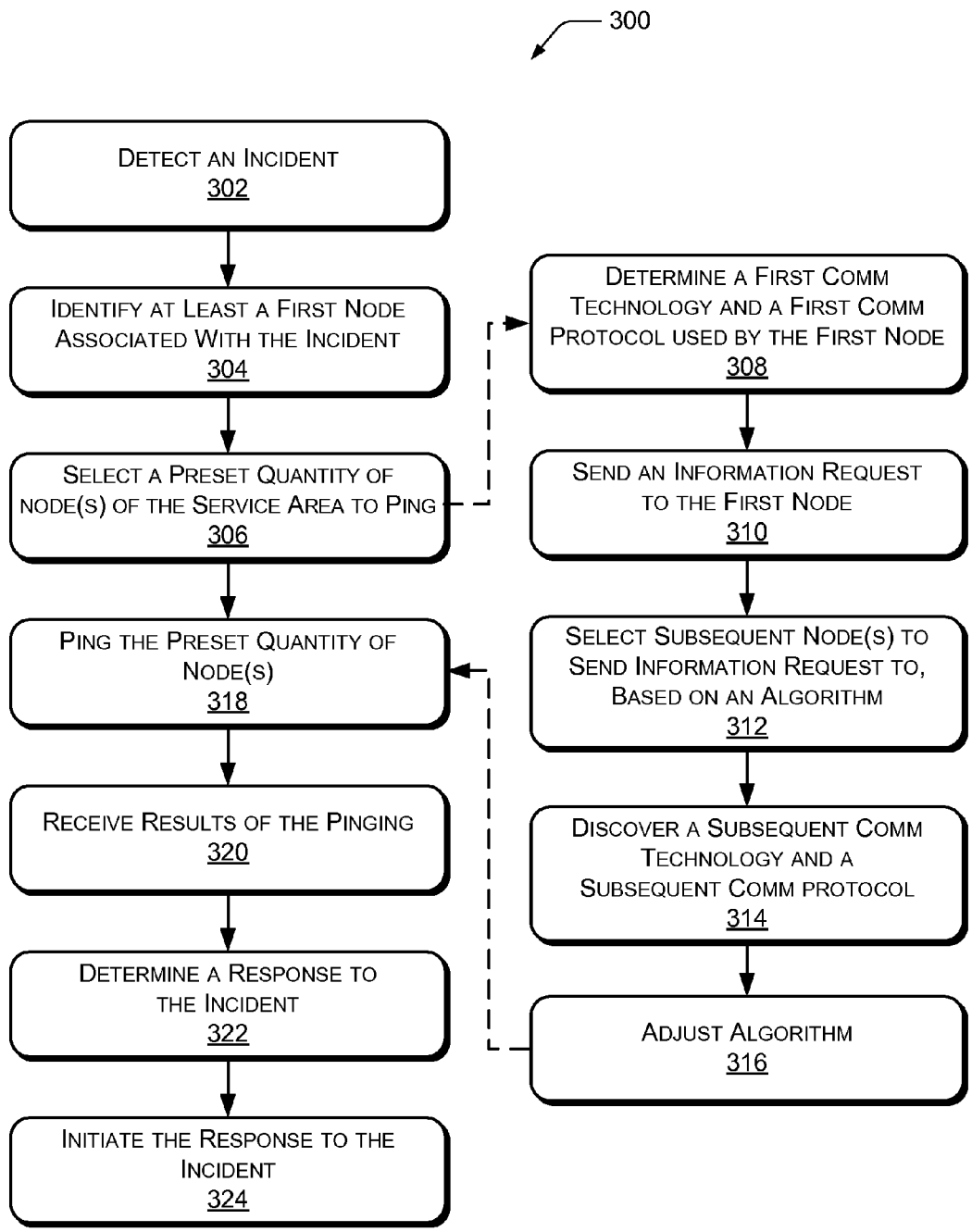
FIG. 3 is a flow diagram illustrating an example outage management process according to one embodiment.

Referring to the illustrations of FIGS. 1 and 2 and the flow diagram of FIG. 3, an example management/diagnosis process 300 is described. For example, the example management/diagnosis process 300 may be used by an outage management system 100. Descriptions of embodiments include examples of devices, types of communication, and other particulars. However, the descriptions are for ease of understanding and are not intended to be limiting. Other suitable devices, types of communication, and the like may be used without departing from the scope of this disclosure.

At block 302 of FIG. 3, an example outage management system, such as outage management system 100, detects an incident in the service area 102. In various embodiments, detecting an incident includes the outage management system 100 becoming informed, notified, or otherwise made aware of the existence of an incident (or a potential incident, etc.) in the service area. In various implementations, the service area 102 is a hierarchal service area for electrical power distribution as discussed above. In alternate implementations, the service area 102 may include one or more of a water distribution service area, a natural gas distribution service area, a cable television distribution service area, or one or more of other types of service areas as also discussed above (e.g., telephone service, satellite entertainment/data service, etc.).

In one embodiment, the outage management system 100 detects an incident when a notice (e.g., telephone call, instant message, etc.) is received from a user (e.g., customer, resident, etc.) of the service area 102, reporting an incident. In an alternate embodiment, the outage management system 100 detects an incident when the communication system 104 receives information from one or more elements of the service area 102 regarding the incident (e.g., outage, substandard service, etc.) within the service area 102. In one example, the communication system 104 may receive notice of an incident from a utility service meter capable of one-way or two-way communications with the communication system 104. In another example, the communication system 104 may receive a notification of the incident from one or more other nodes or devices within the system, such as a service point 114A-114F, a transformer 116A-116D, an isolation device 118, a substation 112, or the like.

In an alternate embodiment, the outage management system 100 may receive a notification of the incident from an intelligent map system 108. For example, the intelligent map system 108 may indicate an incident, and communicate the incident to the communication system 104 and/or the outage management server 108, after being updated based on information received from a customer call, information received from an element or node of the service area 102, or the like. For example, in one implementation, the outage management system 100 may detect an incident in the service area 102 by polling a database linked to the intelligent map system 108. In alternate embodiments, the outage management system 100 may poll the database randomly, periodically or at other intervals (e.g., user defined intervals, intervals based on statistics, etc.). Alternately or additionally, the outage management system 100 may poll the database in response to a request by a user, in response to receiving a notification of an incident, and/or other events. Once the outage management system 100 discovers a reported incident in the database, the incident may be cross referenced to one or more nodes of the service area 102, based on information about the nodes, components, devices, assets, and the like that are stored in the database.

At block 304, the outage management system 100 identifies one or more nodes of the service area 102 as being associated with the incident detected. In various embodiments, identifying an node includes the outage management system 100 becoming informed, notified, or otherwise made aware of the association of a node to the incident (or a potential incident, etc.). In various embodiments, the nodes of the service area that may be identified by the outage management system 100 as being associated with an incident may include one or more of a utility service meter, a transformer, a breaker, a fuse, a recloser, a capacitor, a relay, or a switch. Additionally or alternately, the nodes may include one or more of service points 114A-114F, transformers 116A-116D, isolation devices 118, substation 112, or the like. In alternate embodiments, the nodes may include other components, devices, assets, or elements of a service area 102 (e.g., meters, valves, regulators, amplifiers, repeaters, etc.).

In one embodiment, at least one node may be associated with the incident based on reports received from users, customers and the like. For example, a homeowner may report that his home has no electric power. In another embodiment, a node may be associated with the incident based on communication received by the communication system 104 from one or more elements of the service area 102 as discussed above, and the like. For example, the communication system 104 may receive a notification from a meter at a service point 114 that the voltage at the meter has dropped beyond a threshold level.

In an implementation, the identified node(s) associated with the incident represent a starting point for an investigation (i.e., prediction/diagnosis) of the incident. For example, instead of a utility sending a repair crew to the location of the identified node(s) to investigate the incident, an example outage management system 100 investigates the service area 102 to determine an appropriate response and an appropriate location (if any) to dispatch a crew.

In an embodiment, the investigating includes communicating with one or more nodes of the service area 102. At block 306, the outage management system 100 (for example, using communication system 104) selects a preset quantity of nodes of the service area 102 for pinging. For example, in one embodiment, the communication system 104 selects the node(s) identified in block 304 for pinging. In some embodiments, results of communication with the identified nodes from block 304 may determine whether further pinging of nodes is needed.

As shown in FIG. 3, blocks 308 through 316 may be performed in some embodiments as alternative operations. These alternative operations may be performed when the components of the service area 102 use multiple communication technologies and/or protocols, when the communication system 104 has a capability of determining communication technologies and/or protocols used by various components of the service area 102, and the like.

At block 308, the communication system 104 determines a communication technology and/or a communication protocol used by the node(s) identified in block 304. In various embodiments, the communication system 104 determines the communication technology and/or communication protocol by referring to information populated in a look up table, as described above. In other embodiments, the communication system 104 determines the communication technology and/or communication protocol by inquiring with the node(s), for example.

In one embodiment, the communication system 104 interrogates the identified node(s) based on information available to the communication system 104. For example, the communication system 104 may receive some communication technology information and/or communication protocol information associated with a node when the node is installed in the service area 102. In alternate implementations, a node being interrogated may respond to the communication system 104 with a message verifying the communication technology and/or protocol used by the component.

In an embodiment, the communication system 104 validates the determined communication technology and/or communication protocol prior to sending an information request to the identified node(s). In one implementation, the validating includes various types of communicating with the node(s). For example, the communication system 104 may send the identified node(s) a number of inquiries (pings) using different communication technologies and/or protocols.

At block 310, the communication system 104 sends an information request to the identified node(s) based on the determined communication technology and/or communication protocol. In some embodiments, the communication system 104 performs one-way or two-way communication with the identified node(s).

In various embodiments, communication with the identified node(s) may include taking a reading of information available at the node(s), receiving unsolicited information from the node(s), further interrogating the node(s), receiving a reply from the node(s) based on the interrogation, carrying on a two-way conversation with the node(s), and the like. As part of the communication, the communication system 104 may receive information from the node(s) indicating that the node(s) are on-line, off-line, operational, experiencing an incident of some sort (e.g., break in service, poor quality of service—as compared to one or more threshold values), and the like. In one embodiment, the communication system 104 may interpret a lack of a response from a node as a failure at the node.

Additionally, the communication system 104 may receive associated information about the identified node(s) (or other nodes, devices, components, etc.) as part of the communication with the node(s). For example, the communication system 104 may receive from one or more nodes or components information associating the node(s) and/or other node(s) with one or more electrical phases, routes, or circuits of the service area 102. In other examples, the communication system 104 may receive information including power status or power quality at the node(s) and/or the other node(s), geographical location information regarding the node(s) and/or the other node(s), and the like.

In one implementation, the communication system 104 receives incident information from one or more nodes or components without requesting the incident information, without interrogating the components of the service area, or the like. For example, in one embodiment, service points 114A-114F may broadcast incident information as it occurs, notifying the communication system 104 of a problem. For instance, a service point 114 may autonomously broadcast a low voltage condition, an intermittent break in service, or the like. In other embodiments, service points 114A-114F (or other components in the service area 102) may broadcast incident information as a "last gasp" prior to going off-line in the event of a break in service. Alternately or additionally, a service point 114 (or other component) may broadcast a restoration of service, including a restoration of fully operational service (as measured against one or more threshold values, for example).

At block 312, the communication system 104 selects subsequent node(s) of the service area 102 for pinging or performing one-way or two-way communication. For example, the communication system 104 may selectively poll the service area 102. In one embodiment, the communication system 104 selects a preset quantity of nodes based on an algorithm, where the algorithm is based on one of hierarchy and/or physical location of the node(s) associated with the incident and/or one or more other nodes or components within the service area 102. For example, the communication system 104 may select different sets of nodes for polling depending on where a node associated to the incident is located in relation to other nodes within the hierarchy of the service area 102. Additionally, the communication system 104 may select different sets of nodes for polling depending on where a node (component) associated to the incident is physically located within the service area 102. These and other variations are discussed further in following sections.

In an embodiment, the communication system 104 selects subsequent nodes and polls the service area based on any communication held with the node(s) identified at block 304. In other words, the communication system 104 may determine to communicate with one or more subsequent nodes or components based on a reply (or lack of a reply) or information received from a first node or an initial set of nodes (i.e., components) communicated with. For example, in one embodiment, the communication system 104 selectively polls the service area 102 when a failure response is received from a first component communicated with.

In various embodiments, pinging or polling a subsequent node includes one or more of taking a reading of information available at the subsequent node, receiving unsolicited information from the subsequent node, interrogating the subsequent node, receiving a reply from the subsequent node based on an interrogation, carrying on a two-way conversation with the subsequent node, and the like. In one embodiment, the pinging or polling comprises performing two-way communication with at least one of the preset quantity of nodes or components.

In various embodiments, the preset quantity of nodes selected for polling may be the same nodes or different nodes to those previously communicated with in block 310. In various implementations, the preset quantity may be one or more nodes, and may include all possible nodes in the service area 102. In one embodiment, at least one of the nodes of the preset quantity of nodes is an electrical service device configured for electrical power distribution within the service area 102. In one embodiment, the subsequent node(s) include one or more of a utility service meter, a transformer, a breaker, a fuse, a recloser, a capacitor, a relay, or a switch. In one embodiment, the preset quantity is user adjustable. For example, a user may determine a preset quantity of nodes for the communication system 104 to communicate with, based on the physical layout of the service area 102, the logical connection of the nodes or components, and the like.

At block 314, the communication system 104 discovers one or more subsequent communication technologies and/or one or more subsequent communication protocols used by the subsequent nodes (i.e., stations, devices, components, etc.) of the service area 102. This allows the communication system 104 to communicate with each selected node according to the communication technology and/or communication protocol used by the node. In various embodiments, the communication system 104 discovers the subsequent communication technologies and/or subsequent communication protocols by referring to information populated in a look up table, inquiring with the node(s), and the like.

At block 316, the algorithm is adjusted based on the communication technologies and/or the communication protocols discovered. For example, the algorithm may direct the communication system 104 to communicate with a different quantity of nodes of the service area 102 when power line carrier technology is used by nodes selected for pinging than when a wireless network technology is used by the nodes selected for pinging, based on bandwidth issues of the technologies.

At block 318, the communication system 104 sends an information request (ping) to the preset quantity of nodes. In one embodiment, the communication system 104 sends the information request based on the adjusted algorithm. In an embodiment, the communication system 104 performs one-way or two-way communication with the preset quantity of nodes based on subsequent communication technologies and/or subsequent communication protocols discovered (for example at block 314).

In an embodiment, the communication system 104 validates a communication technology and/or a communication protocol with a subsequent node prior to sending an information request to the node as discussed previously with respect to block 304. In alternate implementations, a node may respond to the communication system 104 with a message verifying the communication technology and/or protocol used by the node.

In one embodiment, the communication system 104 formulates one or more command profiles based on the one or more communication protocols discovered, and stores the one or more command profiles for recurring use. For example, the communication system 104 may formulate a command profile that includes a string of lead characters and/or ending characters, a format for character or bit/byte/packet arrangement, an error check scheme, and the like, for protocols discovered to be used by the nodes. Formulated command profiles may be stored, for example in memory 206, for later use when communicating with a particular node or with other nodes using the same communication profile.

In one embodiment, the communication system 104 performs two-way communication with one or more subsequent nodes of the service area 102 according to the algorithm when a failure response is received from the first node communicated with (for example a node identified in block 304) and a failure response is received from at least one other node of the service area 102. In one embodiment, the communication system 104 interprets a failure response to include a failure of a node to respond.

The communication system 104 may make a determination of which of the nodes of the service area 102 to communicate with based on the hierarchy of the service area 102 and/or a number of nodes physically located at an identified portion of the service area 102. For example, in an embodiment, the communication system 104 performs two-way communication with one or more subsequent nodes of the service area 102 according to the algorithm when a quantity of nodes associated with the hierarchy of one or more nodes of the preset quantity of nodes and/or a quantity of nodes at the physical location of the preset quantity of nodes is less than a threshold quantity.

At block 320, the communication system 104 receives results (a reply) from one or more of the preset quantity of nodes (e.g., stations, devices, components, etc.) based on the pinging. In one embodiment, information is received from one or more nodes using one or more communication technologies and/or one or more communication protocols. For example, the communication system 104 may receive multiple replies from multiple nodes pinged. One or more communication technologies and/or communication protocols may be used by the multiple nodes to reply to the communication system 104.

At block 312, the communication system 104 and/or the outage management server 106 determines a response to the incident based on the results received from communicating with nodes and/or replies (or lack thereof) from the nodes.

At block 314, the communication system 104 and/or the outage management server 106 initiate a response to the incident. In one embodiment, an analysis component of the communication system 104, such as the analysis module 214, determines and initiates a response to the incident. In various embodiments, initiating a response to the incident may include sending notifications to various parties (e.g., users, homeowners, maintenance crews, etc.), initiating a service call to a physical location of an identified node, dispatching a maintenance crew to an incident site, updating or annotating an intelligent map system 108, and the like. In one embodiment, the communication system notifies a user of a status of the incident via one or more of email, text message, mobile device application (e.g., smart phone application, and the like), and so forth.

In one embodiment, the communication system 104 initiates a service call associated with a physical location of a first component communicated with when a response is received from at least one other component indicating that the other component is operating within a preset tolerance (i.e., a normal operational state). For example, when the communication system 104 receives a failure response from a first component, the communication system 104 may communicate with another similar component (such as a meter) on the same route or circuit. If the other component replies that it is operating within a preset tolerance, the communication system 104 may then initiate a service call to the first meter's location. Initiating a service call (or other response) to an incident may include updating an intelligent map system 108, sending a notification to a triage service, sending a notification to a dispatch service, and the like.

In one embodiment, the communication system 104 may close the incident when the results received from communicating with nodes include an indication that at least the first (identified) node is on-line (i.e., normally operational, operating within a preset tolerance, etc.). These and other scenarios are discussed further in a following section.

Example Outage Management Algorithm

In various embodiments, as described above, and as will be illustrated in scenarios that follow, an algorithm may be used (for example by the communication system 104) to select nodes (e.g., stations, devices, components, etc.) of the service area 102 to communicate with, and/or to determine a process by which the nodes will be communicated with. In another embodiment, the algorithm may be used to detect devices in the service area 102.

In one implementation, the algorithm is adjustable. In various embodiments, the algorithm may be adjusted partially or fully automatically and/or the algorithm may be adjusted by a user. In multiple embodiments, the algorithm may be adjusted based on various occurrences, which are illustrated in the scenarios that follow. By way of summary, some of the occurrences are listed here. This listing is not intended to be exhaustive, and other embodiments are contemplated whereby the algorithm may be adjusted and remain within the scope of the disclosure.

In one embodiment, the algorithm may be adjusted based at least in part on results of communication between one or more of the components of the service area 102 and the communication system 104. In another embodiment, the algorithm may be adjusted based on a communication technology and/or a communication protocol used by one or more of the components of the service area 102. In another embodiment, the algorithm may be adjusted based on a bandwidth, a capacity, and/or signal strength of one or more of the communication technologies used by the components of the service area 102.

In another embodiment, the algorithm may be adjusted based on a quantity of components at an identified logical and/or physical location within the service area 102. In a further embodiment, the algorithm may be adjusted based on capabilities of components of the service area 102 to communicate with the communication system 104. In another embodiment, the algorithm may be adjusted based on the types of components or devices present (or detected) in the service area 102. For example, the algorithm may be adjusted to a first configuration when a first type of component of the utility service area 102 is capable of two-way communication, the algorithm may be adjusted to a second configuration when a second type of component of the utility service area 102 is capable of two-way communication, and the algorithm may be adjusted to a third configuration when the first type of component of the utility service area 102 and the second type of component of the utility service area 102 are both capable of two-way communication. Further, the algorithm may be adjusted to a subsequent configuration with the addition of each subsequent type of component of the utility service area 102 that is capable of two-way communication.

In various implementations, the algorithm may include a number of routines, with each routine including a number of steps.

Example Scenario One

Descriptions of embodiments of example scenarios described herein include examples of devices, types of communication, and other particulars. However, the descriptions are for ease of understanding and are not intended to be limiting. Other suitable devices, types of communication, and the like may be used without departing from the scope of this disclosure.

Figure 4:
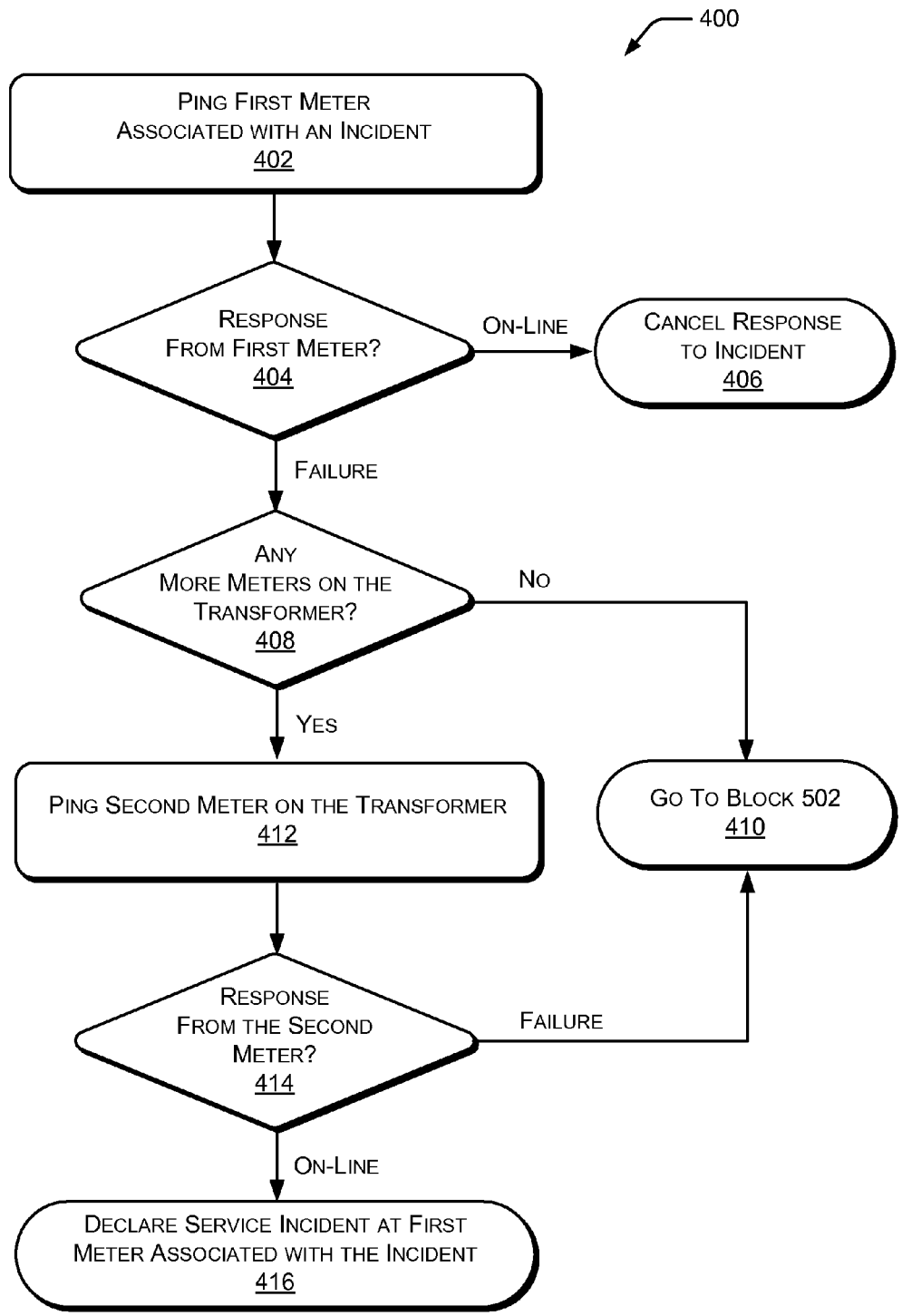
FIG. 4 is a flow diagram illustrating an example outage management algorithm according to an embodiment.

FIG. 4 is a flow diagram illustrating an example outage management algorithm 400 according to an embodiment. The algorithm 400 is described with reference to FIGS. 1-3 and FIG. 6. As described above, the algorithm 400 may be implemented by a communication system 104, for example. In alternate embodiments, the algorithm 400 may be implemented by other portions of an outage management system 100, and remain within the scope of the disclosure.

Figure 6:
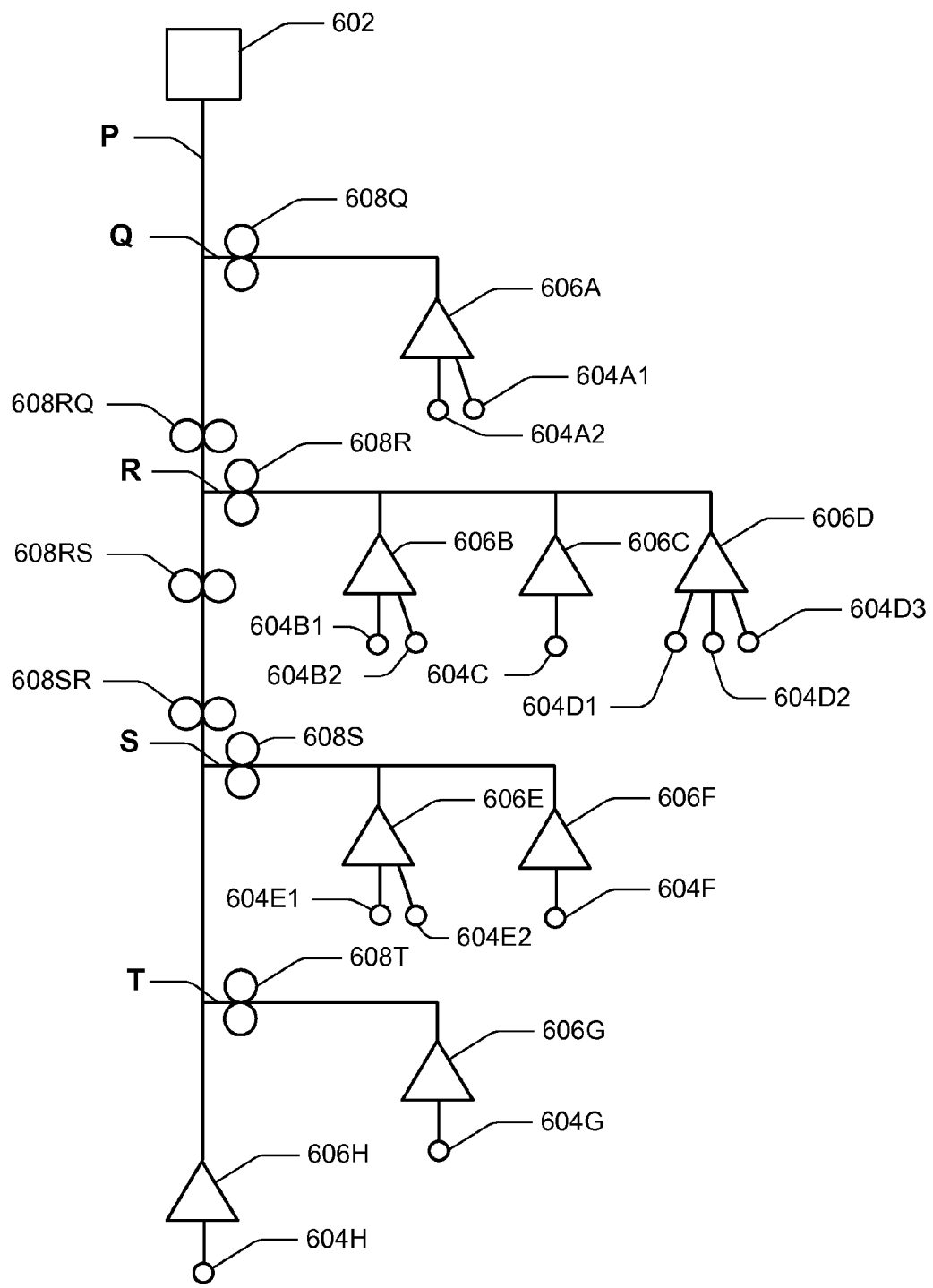
FIG. 6 is a schematic drawing of an example portion of a service area, illustrating an example outage management algorithm according to an embodiment.

FIG. 6 is a schematic drawing of a portion of an example service area 102. FIG. 6 includes a distribution point 602 (e.g., a substation (such as substation 112), a voltage transformation point, etc.); a feeder P; laterals Q, R, S, and T; service points 604A1-A2, 604B-B2, 604C, 604D1-D3, 604E1-E2, 604F, 604G, and 604H (such as service points 114); transformers 606A-606F (such as transformers 116); and isolation devices 608P-608T, 608RQ, 608RS, and 608SR (such as isolation devices 118). Again, the portion of an example service area 102 is illustrated in FIG. 6 to resemble an electrical power service area. This is not intended to be a limitation, and is for ease of discussion only. The features and elements disclosed herein with regard to implementations of an outage management system 100 and an algorithm 400 apply equally to the utilities and service providers mentioned above, and the like. Assets, devices, equipment, end points, distribution components, and the like, within an example electrical power service area as described herein are to be understood to also mean components of other service areas corresponding to other utilities and service providers.

In this example scenario, it is assumed that an incident has been detected as described above and that the incident is associated (as also described above) with meter 604D1 of FIG. 6. Referring to FIG. 4, at block 402 of algorithm 400, a first meter associated with an incident is pinged (for example, by the communication system 104). Accordingly, in this example scenario, meter 604D1 is pinged. In one embodiment, the pinging comprises performing two-way communication with the first meter.

At block 404, the communication system 104 looks to see if a response is received from the first meter. If a response is received from the first meter, and the response indicates that the first meter is on-line, meaning that the meter is operating within a preset tolerance (for example, the voltage at the meter is within normal ranges), then the communication system 104 cancels or closes a response to the incident at block 406. Canceling or closing the response may include sending a message to one or more users (including a customer of the first meter), operators, maintenance personnel, and the like, notifying the parties of the closure. Canceling the response may also include updating an intelligent map system (such as intelligent map system 108).

In one embodiment, a poor response or no response received from the first meter is interpreted by the communication system 104 as a failure response. A poor response may include a response indicating a power quality event that exceeds a preset threshold, such as an over voltage, an under voltage, a phase angle deviation, a waveform distortion, a frequency deviation, a power factor deviation, or a transient waveform event.

If a failure response is received from the first meter, then the communication system 104 looks to see if there are any more meters associated with (fed from) the transformer feeding the first meter (also described as the "first transformer") at block 408. In this example scenario, it is assumed that no response is received from meter 604D1. The communication system 102 interprets the lack of response from meter 604D1 as a failure response, and so the communication system 104 looks to see if there are any more meters associated with the transformer feeding meter 604D1. Meter 604D1 is associated with transformer 606D, since meter 604D1 is fed (receives electric power) from transformer 606D. As shown in FIG. 6, there are two other meters (604D2 and 604D3) associated with transformer 606D.

Figure 5:
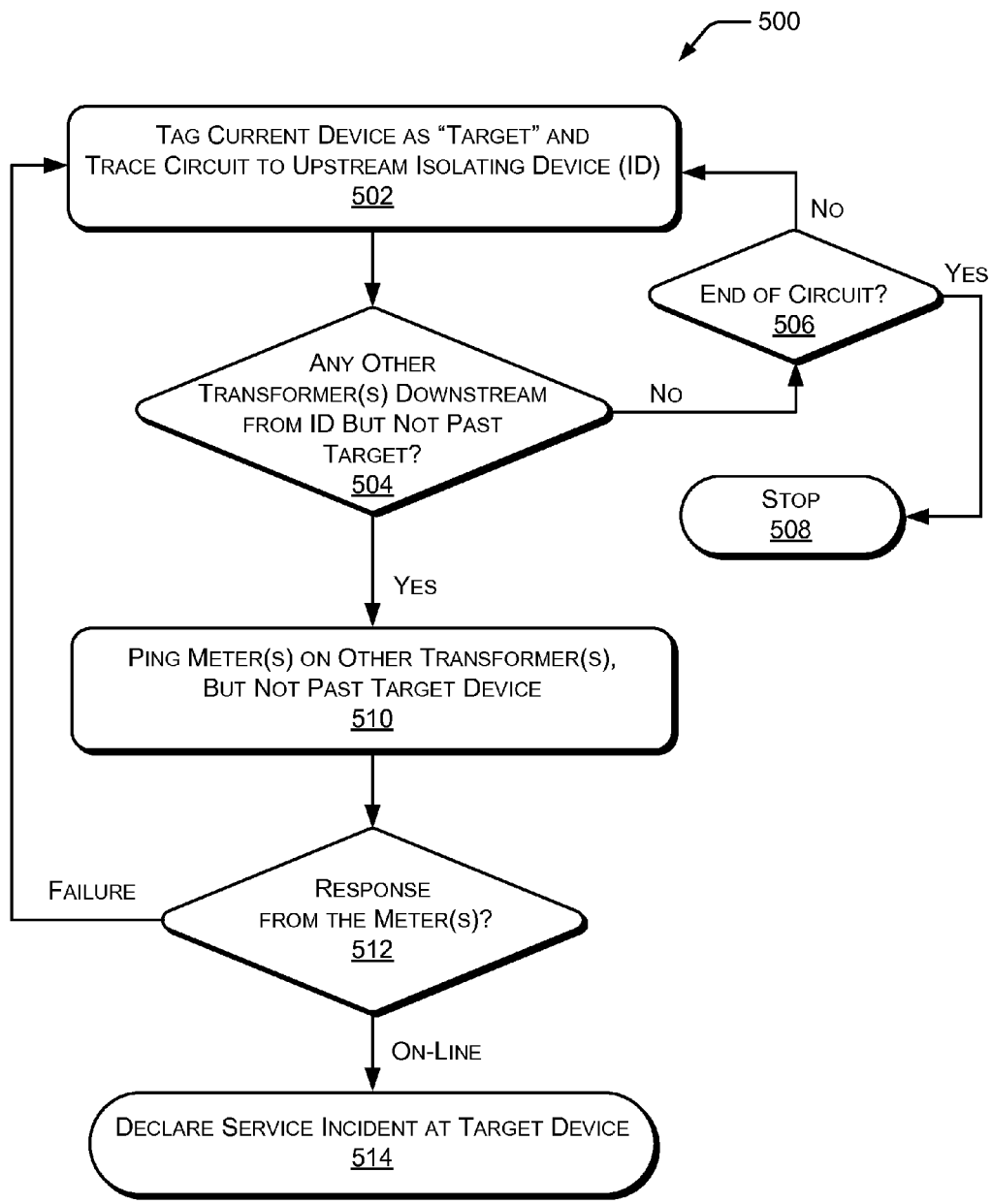
FIG. 5 is a flow diagram illustrating an alternative outage management algorithm according to an alternative embodiment, the alternative embodiment being implemented as a continuation of the added embodiment of FIG. 4 when some preset conditions are met.

If there had been no other meters associated with transformer 606D, then the algorithm 400 would direct (via block 410) the communication system 104 to go to block 502 of the flow diagram on FIG. 5 for further directions.

However, since there are other meters associated with transformer 606D, the communication system 104, at block 412, pings a second meter on the transformer 606D. In one embodiment, the pinging comprises performing two-way communication with the second meter. In alternate embodiments, the algorithm 400 may direct the communication system 104 to ping any number of meters associated with the first transformer. Here, the communication system 104 pings either or both of meters 604D2 and 604D3.

At block 414, the communication system 104 looks to see if there is a response from the second meter pinged. If no response or a poor response is received from the second meter pinged (either of meters 604D2 and 604D3), then the communication system 104 proceeds to block 502 of FIG. 5 for further directions.

Alternately, if a response is received from the second meter indicating that the second meter is operating within a preset tolerance (is on-line) then the communication system 104 declares a service incident at the first meter (604D1). Declaring a service incident by the communication system 104 may include sending a notice to one or more users, operators, maintenance personnel, incident response systems, and the like, that service is indicated at the first meter. Declaring a service incident may also include updating an intelligent map system (such as intelligent map system 108). In some embodiments, declaring a service incident may include dispatching a crew to the location of the first meter, assembling a list of tools or parts to take to the location of the first meter, and the like.

In an alternative embodiment of the algorithm 400, the algorithm 400 is adjusted based on nodes of the service area 102 that are capable of communicating with the communication system 102. For example, in one embodiment, the algorithm 400 is adjusted when transformers in the service area 102 are capable of communicating with the communication system 102.

In such an embodiment, the communication system 102 pings the first transformer associated to the first meter when a failure response is received from the first meter. For example, at block 404 of an alternative scenario, instead of looking to see if there are more meters on the first transformer 606D after receiving a failure response from the meter 604D1, the communication system 104 pings transformer 606D.

Accordingly, the communication system 104 declares a service incident at the first meter (604D1) when a failure response is received from the first meter (604D1) and a response is received from the first transformer (606D) indicating that the first transformer (606D) is operating within a preset tolerance (operating normally). Alternately, the communication system 104 proceeds to block 502 of FIG. 5 for further directions when no response or a poor response is received from the first transformer (606D).

Example Scenario Two

FIG. 5 is a flow diagram illustrating an example outage management algorithm 500 according to an embodiment. The algorithm 500 is described with reference to FIGS. 1-4 and FIG. 6. As described above, the algorithm 500 may be implemented by a communication system 104, for example. In alternate embodiments, the algorithm 500 may be implemented by other portions of an outage management system 100, and remain within the scope of the disclosure.

In various embodiments, algorithm 500 is performed by the communication system 104 after performing algorithm 400 and receiving failure responses from one or more of the nodes pinged. For example, algorithm 500 may be considered to be a second and/or a third routine of algorithm 400 (where examples are given in example scenario two and example scenario three). In alternate embodiments, algorithm 500 may be performed exclusive of algorithm 400, or prior to algorithm 400.

Algorithm 500 describes a process that may include recursive operations for at least part of the algorithm 500 (depending on the results of some of the included operations). For ease of description, some terms used herein are defined for the purposes of this application in order to describe the recursive operations. For example, during a recursive operation, the algorithm 500 determines whether a service incident is to be declared at a particular node (e.g., site, device, component, etc.) of the service area 102. Accordingly, the particular node may be tagged (i.e., indicated, labeled, etc.) as the "target device," for one or more iterations of a recursive operation.

Operations may be referred to as being performed "upstream" or "downstream" from a particular node. In general, "upstream" indicates in a direction towards a source (of power, water, gas, etc.) and "downstream" indicates in a direction away from the source. The algorithm 500 may direct operations to be performed relative to a particular node, or from the point of view of a particular node. Such a node may be considered a reference node or a "current device," meaning the current (i.e., present, most recent, etc.) reference for an operation. The current device (reference device) may change at least once during a single iteration of a recursive operation. Since the algorithm 500 proceeds in a generally upstream manner, a device that is at a next higher level in a hierarchy of the service area 102 often becomes a current device during recursive operations.

At block 502, a current device is tagged as a target device. In other words, the present node at the time is tagged as a target, to determine if a service incident is to be declared at that node. In the example scenario, since the communication system 104 received a failure response from meters 604D1 and/or either of 604D2-D3, investigation of the incident begins at the transformer feeding the meters 604D1-D3 (transformer 606D). Accordingly, transformer 606D is the current device, and is tagged as a target device.

Still at block 502, the communication system 104 traces the circuit to an upstream isolation device. In various embodiments, tracing the circuit includes looking upstream from the target device along the connecting paths towards the source, until an isolation device is encountered. For the purposes of this application, an isolation device includes any device capable of breaking and/or making a connection to the target device from the source. For example, an isolation device is capable of removing the supply from (and/or replacing the supply to) the target device. Examples of isolation devices include switches, breakers, fuses, reclosers, valves, disconnects, and the like. As shown in FIG. 6, the circuit may be traced from the transformer 606D, along the lateral R, and to the isolation device 608R. (This assumes that transformer 606D does not include an isolation device. In alternate embodiments, one or more of the transformers 606 may include an isolation device.)

At block 504, the communication system 104 looks to see if there is a transformer downstream of the isolation device, but not past (downstream of) the target device. As shown in FIG. 6, there are two transformers (606F and 606G) downstream of isolation device 608R and neither is downstream of transformer 606D.

If there had been no transformers downstream of the isolation device (608R), but not past (downstream of) the target device (transformer 606D), then the communication system would be directed by algorithm 500 to return to block 502, via block 506. At block 506, the algorithm returns to block 502 if the end of the circuit has not been reached. If the end of the circuit has been reached (i.e., the circuit has been traced to an origin) then the algorithm terminates at block 508. With a return to block 502, the isolation device 608R would be tagged as the target device (since it is now the current device), and the communication system 104 would trace the circuit further upstream of isolation device 608R to the next isolation device 608RQ on feeder P, as discussed in example scenario three below.

However, since there are transformers (606F and 606G) downstream of isolation device 608R and neither is downstream of transformer 606D, the algorithm continues at block 510. At block 510, the communication system 104 pings at least one meter associated with at least one transformer downstream from the upstream isolating device. In the example scenario, communication system 104 pings at least one of meters 604B1-B2 and 604C.

At block 512, the communication system 104 looks to see if there is a response from the meter(s) pinged. If no response or a poor response is received from the meter(s) pinged (any of meters 604B1-B2 and 604C), then the communication system 104 proceeds back to block 502 as described above.

Alternately, if a response is received from the meter(s) indicating that the meter(s) are operating within a preset tolerance (are on-line) then the communication system 104 declares a service incident at block 514 (as described above) at the target device (transformer 606D).

Accordingly, in one embodiment, the communication system 102 declares a service incident at the first transformer (606D) when the communication system 102 receives a response from the at least one meter (e.g., meters 604B1-B2 and/or meter 604C) associated with the at least one transformer (e.g., transformers 606B and/or 606C) downstream from the upstream isolating device (608R) indicating that the at least one meter (meters 604B1-B2 and/or meter 604C) is operating within a preset tolerance.

Example Scenario Three

In example scenario three, it is assumed that a failure response is received at the communication system 104 from all components pinged in the previous two scenarios. Alternately, example scenario three would also apply, as discussed in the previous example scenario two, if there were no further meters (or transformers) downstream from the isolation device 608R, aside from the meters associated with transformer 606D.

At block 502 a current device is tagged as a target device. In example scenario three, the isolation device 608R is the current device, and so it is tagged as the target device. The communication system 104 traces the circuit to an upstream isolation device (608RQ), which becomes the current device.

At block 504, the communication system 104 looks to see if there is a transformer downstream of the isolation device, but not past (downstream of) the target device. As shown in FIG. 6, there are no transformers downstream of isolation device 608RQ that are not downstream of isolation device 608R. Thus, the algorithm 500 returns to block 502, via block 506 (since the circuit continues upstream), tagging isolation device 608RQ as the target device, and tracing the circuit to a subsequent upstream isolation device. Here, the subsequent upstream isolation device is distribution point 602, which becomes the current device.

At block 504, the communication system 104 looks to see if there is a transformer downstream of the subsequent isolation device (distribution point 602), but not past (downstream of) the target device (608RQ). As shown in FIG. 6, there is one transformer (606A) downstream of distribution point 602 that is not also downstream of isolation device 608RQ.

At block 510, the communication system 104 pings at least one meter (604A1-A2) associated with at least one transformer (606A) downstream from the subsequent upstream isolating device (distribution point 602).

At block 512, the communication system 104 looks to see if there is a response from the meter(s) pinged. If no response or a poor response is received from the meter(s) pinged (either of meters 604A1-A2), then the communication system 104 proceeds back to block 502 as described above. In the case of example scenario three, the investigation may then proceed upstream of the distribution point 602.

In alternate embodiments, the communication device 104 repeats the operations of the third routine (algorithm 500, for example as described in example scenario three) when there are no other meters associated with a transformer downstream from a subsequent upstream isolating device or there is a failure response from at least one meter associated with a transformer downstream from the subsequent upstream isolating device.

Additionally or alternatively, the algorithm 500 directs the communication system 104 to recursively perform operations of the third routine until a service incident is declared at a target device.

At block 514, the communication system 102 declares a service incident at the target device (608RQ) when a response is received from at least one meter (either of meters 604A1-A2) associated with at least one transformer (606A) downstream from the subsequent upstream isolating device (608RQ) indicating that at least one meter (either of meters 604A1-A2) associated with at least one transformer (606A) downstream from the subsequent upstream isolating device (608RQ) is operating within a preset tolerance.

In an alternative embodiment of the algorithm 500, the algorithm 500 is adjusted based on nodes of the service area 102 that are capable of communicating with the communication system 102. For example, in one embodiment, the algorithm 500 is adjusted when transformers in the service area 102 are capable of communicating with the communication system 102. In another embodiment, the algorithm 500 is adjusted when isolation devices are capable of communicating with the communication system 102. In a further embodiment, the algorithm 500 is adjusted based on other devices of the service area 102, associated to an upstream isolation device or a subsequent upstream isolation device, that are capable of communicating with the communication system 102.

In such embodiments, the communication system 102 may ping one or more of the transformers (606B and 606C) associated to the upstream isolation device (608R) when a failure response is received from the meters associated with the target transformer, or from the target transformer (606D). Thus, the communication system 102 declares a service incident at the target device (606D) when the communication system receives a response from one of the transformers (606B and 606C) associated to the upstream isolation device (608R) indicating that the transformers (606B and 606C) are operating within a preset tolerance (i.e., operating normally).

Alternately or additionally, the communication system 102 may ping an isolation device (608R) associated with the target transformer (606D). Thus, the communication system 102 declares a service incident at the target device (606D) when the communication system receives a response from an upstream isolation device (608R) indicating that the upstream isolation device (608R) is operating within a preset tolerance (i.e., operating normally).

Further, the communication system 102 may ping one or more other devices associated with an upstream isolation device (608R) or a subsequent upstream isolation device (608RQ) associated with the target transformer (606D). In various embodiments, the other devices associated with the upstream isolation device (608R) or the subsequent upstream isolation device (608RQ) may include one or more of a transformer, a breaker, a fuse, a recloser, a capacitor, a relay, or a switch. Thus, the communication system 102 declares a service incident at the target device (606D) when the communication system receives a response from one or more of the other devices associated with the upstream isolation device (608R) or subsequent upstream isolation device (608RQ) indicating that the one or more of the other devices associated with the upstream isolation device (608R) or a subsequent upstream isolation device (608RQ) is operating within a preset tolerance (i.e., operating normally).

Accordingly, one skilled in the art will recognize the variety of adjustments that may be made to the algorithm 500 depending on the number and type of devices (or nodes) in the service area 102 that are capable of communicating with the communication system 104, including, those capable of two-way communication with the communication system 104 (for example, via the communication module 212).

CONCLUSION

While various discreet embodiments have been described throughout, the individual features of the various embodiments may be combined to form other embodiments not specifically described. The embodiments formed by combining the features of described embodiments are also outage management systems 100.

What is claimed is:

1. A computer-implemented method of processing an incident in a utility service area, the method comprising:
   under control of one or more processors configured with executable instructions:
   detecting the incident in the utility service area;
   identifying a plurality of utility devices within the utility service area to which to send an information request, based on the detected incident;
   interrogating one or more utility devices of the plurality of utility devices to determine one or more of a communication technology, a communication protocol, or a combination thereof used by the one or more utility devices;
   selecting a preset quantity of utility devices comprising a subset of the plurality of utility devices based at least in part on the results of the interrogation;
   sending an information request to the preset quantity of utility devices using one or more of a communication technology, one or more of a communication protocol, or a combination thereof, based at least in part on the results of the interrogation;
   receiving results from the one or more utility devices based on the sending; and
   formulating a response to the incident based on the results of the sending.

2. The computer-implemented method of claim 1, wherein the plurality of utility devices comprise one or more of a utility service meter, a transformer, a breaker, a fuse, a recloser, a capacitor, a relay, or a switch.

3. The computer-implemented method of claim 1, wherein at least one of the detecting, identifying, interrogating, sending, or formulating is performed on a remote processor.

4. The computer-implemented method of claim 1, further comprising receiving information from the plurality of utility devices using one or more of a communication technology, one or more of a communication protocol, or a combination thereof.

5. The computer-implemented method of claim 1, further comprising sending the information request to the plurality of devices based at least in part on an adjustable algorithm, the algorithm being adjustable based at least in part on the results of the interrogation; and
formulating an adjustment to the algorithm at least partially based on a bandwidth, a capacity, a signal strength of the one or more communication technologies, or a combination thereof.

6. A computer-implemented method of processing an incident in a utility service area, the method comprising:
under control of one or more processors configured with executable instructions:
detecting the incident in the utility service area;
identifying a first component of the utility service area to which to send an information request, based on the detected incident;
determining a first communication technology and a first communication protocol used by the first component;
sending an information request to the first component using the first communication technology and the first communication protocol;
selecting, by the one or more processors, one or more subsequent components of the utility service area to which to send an information request, the selecting based at least in part on an algorithm;
discovering one or more of a subsequent communication technology, one or more of a subsequent communication protocol, or a combination thereof used by the one or more subsequent components;
adjusting the algorithm based on the discovering, the adjusting comprising selecting a preset quantity of components of the utility service area, the preset quantity comprising the one or more subsequent components;
sending one or more information requests to the one or more subsequent components using the one or more subsequent communication technologies and the one or more subsequent communication protocols;
receiving results from the one or more subsequent components based on the sending; and
initiating a response to the incident based on the received results.

7. The computer-implemented method of claim 6, wherein the detecting comprises polling a database linked to an intelligent map system for a reported incident, and cross referencing the reported incident to the first component.

8. The computer-implemented method of claim 6, wherein the first component comprises a utility service meter.

9. The computer-implemented method of claim 6, wherein the one or more subsequent components comprise one or more of a utility service meter, a transformer, a breaker, a fuse, a recloser, a capacitor, a relay, or a switch.

10. The computer-implemented method of claim 6, wherein at least one of the determining or the discovering comprises referring to information populated in a look up table, the information being populated in the lookup table prior to the referring to the lookup table.

11. The computer-implemented method of claim 10, further comprising populating the look up table with information derived from an intelligent map system.

12. The computer-implemented method of claim 6, further comprising validating the determining of at least one of the first communication technology or the first communication protocol with the first component, the validating comprising communication with the first component.

13. The computer-implemented method of claim 6, further comprising formulating an adjustment to the algorithm based on a bandwidth, a capacity, a signal strength of the one or more subsequent communication technologies discovered, or a combination thereof.

14. The computer-implemented method of claim 6, further comprising formulating one or more command profiles based on the one or more communication protocols discovered, and storing the one or more command profiles for recurring use.

15. An outage management system comprising:
a plurality of utility service devices of a heterogeneous utility service area, one or more utility service devices of the plurality of utility service devices being configured to communicate using at least one of a disparate communication technology or a disparate communication protocol than another utility service device of the plurality of utility service devices;
a communication system communicatively coupled to the plurality of utility service devices, the communication system configured to communicate with each utility service device of the plurality of utility service devices using at least one of a respective communication technology or a respective communication protocol used by the utility service device according to an algorithm, the algorithm being adjustable based at least in part on the disparate communication technology used by the one or more utility service devices of the plurality of utility service devices, the algorithm comprising selecting a preset quantity of service devices of the plurality of utility devices for communication based at least in part on the disparate communication technology used by the one or more utility service devices of the plurality of utility service devices; and
an outage management server coupled to the communication system and configured to formulate a response to an incident within the heterogeneous utility service area, based on communication between the communication system and at least one of the plurality of utility service devices.

16. The outage management system of claim 15, wherein the communication system and the at least one of the plurality of utility service devices are configured for two-way communication with each other.

17. The outage management system of claim 15, wherein the respective communication technology used by the utility service device comprises one of: power line carrier technology, local area wired network technology, dial-up modem technology, cellular technology, satellite technology, local area wireless network technology, wide area wireless network technology, or wireless personal area network technology.

18. The outage management system of claim 15, wherein the outage management system is configured to notify a user of a status of the at least one of the plurality of utility service devices.

19. The outage management system of claim 18, wherein the outage management system is configured to notify a user of a status of the incident via one or more of email, text message, mobile device application, or a combination thereof.

20. The outage management system of claim 15, wherein the communication system is configured to interrogate one or more utility service devices of the plurality of utility service devices to determine at least one or more of a communication technology or a communication protocol used by the one or more utility service devices.

21. The outage management system of claim 20, wherein the communication system is configured to reconfigure at least one of the communication technology, the communication protocol at the communication system, or a combination thereof, based on the interrogation, after communicating with the one or more utility service devices of the plurality of utility service devices and prior to communicating with the other utility service device of the plurality of utility service devices.

22. The outage management system of claim 15, wherein the communication system is configured to automatically initiate communication with the at least one of the plurality of utility service devices to perform one or more of: an inventory, a status check, a power quality audit, a validation of installation, a maintenance routine, an isolation of the incident, a diagnosis, and a validation of restoration of services.

23. The outage management system of claim 15, wherein at least one of the communication system or the outage management server is physically located remote from the heterogeneous utility service area.

24. The outage management system of claim 15, further comprising a memory having a database stored thereon, the memory coupled to the communication system, the database including at least one or more of communication technology information, communication protocol information about at least a portion of the plurality of utility service devices, or a combination thereof.

25. The outage management system of claim 15, further comprising an intelligent map system communicatively coupled to the communication system, the intelligent map system configured to update based on communication between the communication system and at least one of the plurality of utility service devices.

26. The outage management system of claim 25, wherein the intelligent map system is configured to update a database comprising at least one of communication technology information, communication protocol information about at least a portion of the plurality of utility service devices, or a combination thereof.

27. The outage management system of claim 25, wherein the communication system is configured to detect a utility service device added to the heterogeneous utility service area based on information received from the intelligent map system, the received information including location information of the added utility service device.

28. A communication system comprising:
one or more processors;
memory communicatively coupled to the one or more processors;
a detection module stored in the memory and executable at the one or more processors to detect one or more utility service meters of a plurality of utility service meters within a hierarchal utility service area; and
a communication module stored in the memory and executable at the one or more processors to communicate with the one or more utility service meters using one or more disparate communication technologies and one or more disparate communication protocols respectively, the communication module configured to communicate with the one or more utility service meters according to an algorithm, the algorithm being adjustable based at least in part on the one or more communication technologies used by the utility service meters, the algorithm comprising selecting a preset quantity of utility service meters of the plurality of utility service meters for communication based at least in part on the one or more communication technologies used by the utility service meters.

29. The communication system of claim 28, wherein the communication module is further configured to communicate with one or more electrical service devices including: an electrical service meter, a transformer, a breaker, a fuse, a recloser, a capacitor, a relay, or a switch using one or more additional communication technologies, one or more additional communication protocols, or a combination thereof.

30. The communication system of claim 29, wherein at least one of the one or more additional communication technologies are disparate from each other, the one or more additional communication protocols are disparate from each other, or a combination thereof.

31. The communication system of claim 29, wherein the detection module is configured to detect the one or more electrical service devices upon initialization of the system.

32. The communication system of claim 29, wherein the detection module is configured to detect the one or more electrical service devices upon addition of the one or more utility service meters to the hierarchal utility service area.

33. The communication system of claim 29, wherein the detection module is configured to detect the one or more electrical service devices according to the algorithm.

34. The communication system of claim 29, wherein the communication module is further configured to remotely disable services at the one or more electrical service devices.

35. The communication system of claim 29, wherein the communication module is configured to automatically initiate communication with the one or more electrical service devices to perform at least one of: an inventory, a status check, a power quality audit, a standards compliance check, a validation of installation, a maintenance routine, an isolation of the incident, a diagnosis, a validation of restoration of services, or a combination thereof.

36. The communication system of claim 29, wherein the communication module is configured to communicate two-way with the one or more electrical service devices.

* * * * *